(12) United States Patent
Satonaga et al.

(10) Patent No.: US 7,903,844 B2
(45) Date of Patent: Mar. 8, 2011

(54) FAILURE ANALYSIS SYSTEM, FAILURE ANALYSIS METHOD, AND PROGRAM PRODUCT FOR FAILURE ANALYSIS

(75) Inventors: Tetsuichi Satonaga, Kanagawa (JP); Koki Uwatoko, Kanagawa (JP); Koji Adachi, Kanagawa (JP); Kaoru Yasukawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1091 days.

(21) Appl. No.: 11/652,531

(22) Filed: Jan. 12, 2007

(65) Prior Publication Data

US 2007/0237399 A1 Oct. 11, 2007

(30) Foreign Application Priority Data

Apr. 7, 2006 (JP) ................. 2006-106765

(51) Int. Cl.
*G06K 9/03* (2006.01)
(52) U.S. Cl. ............ 382/112; 382/174; 358/1.14
(58) Field of Classification Search ........... 382/112; 399/15

See application file for complete search history.

(56) References Cited

U.S. PATENT DOCUMENTS

| | | | | |
|---|---|---|---|---|
| 5,757,981 | A * | 5/1998 | Kawakubo | 382/293 |
| 6,665,425 | B1 | 12/2003 | Sampath et al. | |
| 2003/0113000 | A1 * | 6/2003 | Hyoki et al. | 382/112 |

FOREIGN PATENT DOCUMENTS

| | | |
|---|---|---|
| EP | 1 109 395 A2 | 6/2001 |
| JP | A 3-154128 | 7/1991 |
| JP | A 5-114970 | 5/1993 |
| JP | B2 2534387 | 9/1996 |
| JP | B2 2564490 | 12/1996 |
| JP | B2 2793424 | 9/1998 |
| JP | A 11-164081 | 6/1999 |
| JP | A 2000-62299 | 2/2000 |
| JP | A-2001-245091 | 9/2001 |

(Continued)

OTHER PUBLICATIONS

Yokosawa; "Human Character Retrieval Process and Its Application to Textual Image Retrieval;" Journal of Institute of Electronic Information Communication Engineers; Japan; Institute of Electronic Information Communication Engineers; Feb. 25, 1990; J73-D-II; 2; pp. 191-199; with partial English-language translation.

(Continued)

*Primary Examiner* — Brian P Werner
(74) *Attorney, Agent, or Firm* — Oliff & Berridge, PLC

(57) ABSTRACT

A failure analysis system includes an obtaining portion that obtains read-in image information that is image information obtained by reading an output image, a memory that stores fundamental image reduction information that is information in which an information amount of fundamental image information is reduced, the fundamental image information serving as a fundamental of the output image, a calculating portion that calculates a characteristic value of a projecting waveform by use of differential information between read-in image reduction information and the fundamental image reduction information, the read-in image reduction information being information in which the information amount of the read-in image information obtained by the obtaining portion is reduced, the fundamental image reduction information being stored in the memory; and a determining portion that determines a defect type group that is a group of defect types of elements included in the output image by use of a clustering process.

9 Claims, 21 Drawing Sheets

FOREIGN PATENT DOCUMENTS

| | | |
|---|---|---|
| JP | A 2002-40724 | 2/2002 |
| JP | A 2004-085668 | 3/2004 |
| JP | B2 3581897 | 10/2004 |
| JP | A 2005-91766 | 4/2005 |
| JP | A 2005-107067 | 4/2005 |
| JP | A 2005-341005 | 12/2005 |
| JP | A 2006-62171 | 3/2006 |
| JP | A 2006-252002 | 9/2006 |
| JP | A 2007-74290 | 3/2007 |
| JP | A 2007-88664 | 4/2007 |
| JP | A 2007-102506 | 4/2007 |
| JP | A 2007-133472 | 5/2007 |
| JP | A 2007-280136 | 10/2007 |

OTHER PUBLICATIONS

Notice of Reason(s) for Refusal issued in Japanese Patent Application No. 2006106765; mailed Aug. 3, 2010; with English-language translation.

* cited by examiner

FAILURE ANALYSIS SYSTEM, FAILURE ANALYSIS METHOD, AND PROGRAM PRODUCT FOR FAILURE ANALYSIS

BACKGROUND

1. Technical Field

This invention relates generally to failure analysis systems and failure analysis methods of an image forming apparatus, and particularly to a failure analysis system and a failure analysis method, by which an optimal test chart can be determined to identify the cause of malfunction.

2. Related Art

Image forming apparatuses have multiple functions, and such functions are sophisticated and the performances thereof are improved. This results in the complexity of malfunction. Even for those skilled, it is difficult to identify the cause of malfunction. Therefore, there is a demand for a failure analysis system or the like, which supports identifying the failure cause in the image forming apparatus. As a failure analysis system or the like having such functionality, there is known a failure analysis system that collects machine data or job data in an image forming apparatus, analyzes the collected data by use of a failure analysis inference engine, and determines a test chart used for the failure analysis based on the analysis result.

SUMMARY

An aspect of the present invention provides a failure analysis system including: an obtaining portion that obtains read-in image information that is image information obtained by reading an output image; a memory that stores fundamental image reduction information that is information in which an information amount of fundamental image information is reduced, the fundamental image information serving as a fundamental of the output image; a calculating portion that calculates a characteristic value of a projecting waveform by use of differential information between read-in image reduction information and the fundamental image reduction information, the read-in image reduction information being information in which the information amount of the read-in image information obtained by the obtaining portion is reduced, the fundamental image reduction information being stored in the memory; and a determining portion that determines a defect type group that is a group of defect types of elements included in the output image by use of a clustering process on the basis of the characteristic value calculated by the calculating portion.

BRIEF DESCRIPTION OF THE DRAWINGS

Embodiments of the present invention will be described in detail based on the following figures, wherein.

DETAILED DESCRIPTION

A description will now be given, with reference to the accompanying drawings, of exemplary embodiments of the present invention.

Figure 1:
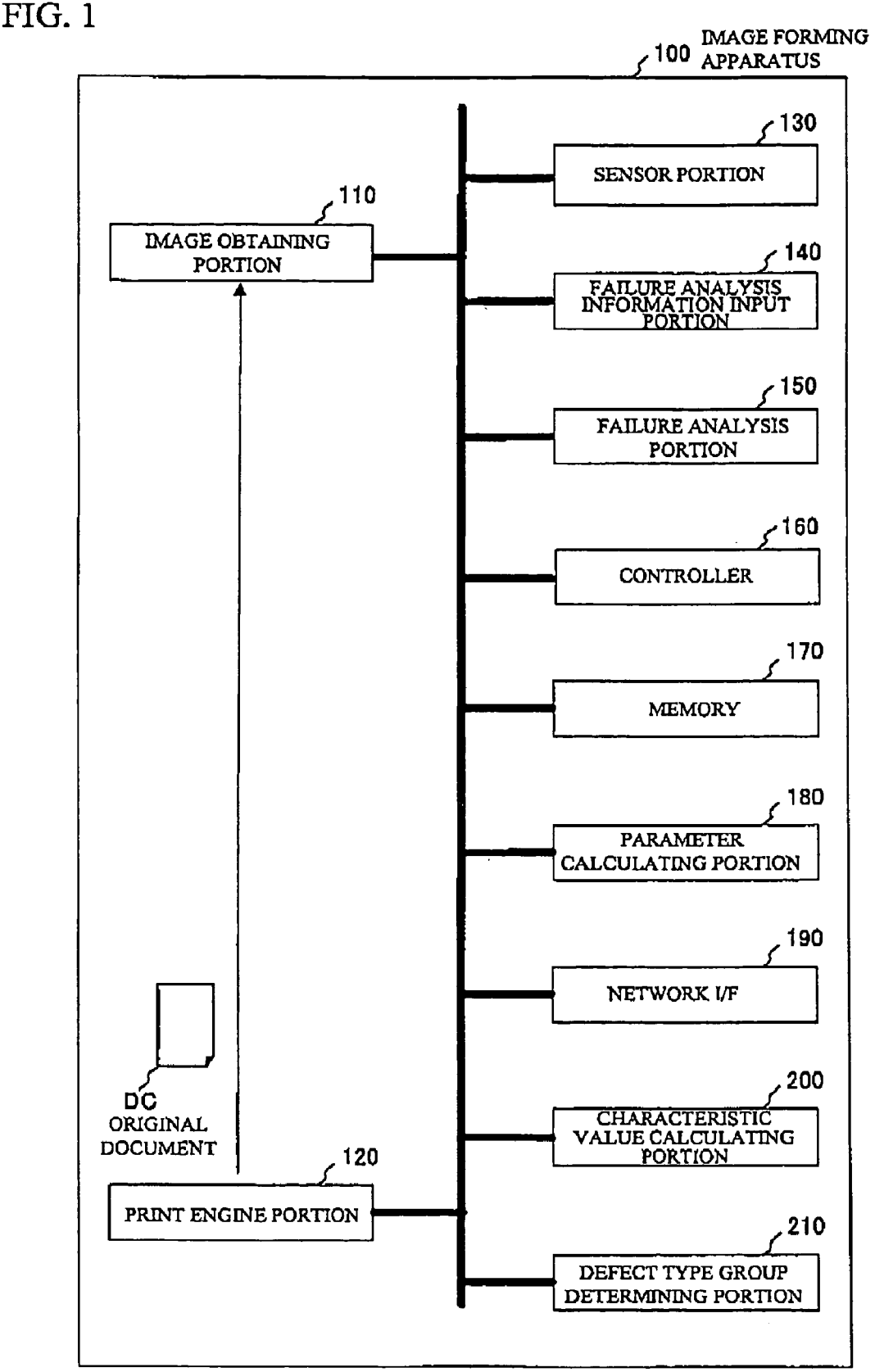
FIG. 1 shows a structural diagram showing an exemplary embodiment of an image forming apparatus 100 according to an aspect of the invention.

A description will be hereinafter given of an exemplary embodiment of the invention with reference to the attached drawings. FIG. 1 shows a structural diagram showing an exemplary embodiment of an image forming apparatus 100 according to an aspect of the invention.

The image forming apparatus 100 is composed of: an image obtaining portion 110 serving as an obtaining portion; a print engine portion 120; a sensor portion 130; a failure analysis information input portion 140; a failure analysis portion 150; a controller 160; a memory 170; a parameter calculating portion 180, a network interface portion 190, a characteristic value calculating portion 200 serving as a calculating portion; and a defect type group determining portion 210 serving as a determining portion.

The image obtaining portion 110 is composed of, for example, an optical reading apparatus such as a scanner or the like, and reads an original document DC to obtain image information. In particular, when the image obtaining portion 110 causes the print engine portion 120 to output the original document DC, the image obtaining portion 110 obtains read-in image information which is image information obtained by reading in the original document DC, which is to be an output image.

The print engine portion 120 forms and outputs a read-in image or an image instructed to be printed out. In particular, when the image obtaining portion 110 obtains the image information from an original document DC having an image defect output from the print engine portion 120, such image information is referred to as defective image information.

The sensor portion 130 is composed of a group of sensors. The group of sensors obtains information on sheet passing time, a driving current, and internal conditions of the apparatus such as temperature and humidity in the apparatus.

The failure analysis information input portion 140 is composed of, for example, a touch panel, a pointing device, a keyboard, or the like. Information necessary for failure analysis is input from a user. The failure analysis portion 150 performs a failure analysis of the image forming apparatus 100 based on each piece of information obtained by the failure analysis information input portion 140.

Specifically, the failure analysis portion 150 analyzes a failure analysis model 1543, described later, which models a cause for the failure of the image forming apparatus 100, and thereby analyzes the failure of an individual component member composing the image forming apparatus 100. Then, the failure analysis portion 150 identifies the failure cause by analyzing a failure analysis model corresponding to a defect type determined by a type determining portion by use of information on a characteristic amount, described later, and internal condition information, described later.

The controller 160 is composed of: for example, a processor such as a CPU; a memory such as a RAM; a recording apparatus such as a ROM; and a program that controls the aforementioned devices. The controller 160 controls: the image obtaining portion 110; the print engine portion 120; the sensor portion 130; the failure analysis information input portion 140; the failure analysis portion 150; the parameter calculating portion 180; the network interface portion 190; the characteristic value calculating portion 200; and the defect type group determining portion 210; and the like. The control process and the like executed by the controller 160 will be described later.

The memory 170 is composed of, for example, a hard disk or the like. The controller 160 controls storing to associate output image reduction information with an output image print coverage, in the memory 170.

The output image reduction information denotes information in which an information amount of output image information is reduced. More specifically, the output image reduction information denotes reduced information, in which the information amount of the read-in image information obtained by reading the output image by the image obtaining portion 110 is reduced when a copy function is provided, or in which the information amount of image information or the like obtained by the network interface portion 190 is reduced when a printer function is provided. The output image information denotes image information serving as a fundamental of the output image output in the past.

The output image print coverage denotes a print coverage of the output image information. The print coverage represents a ratio of a print region to the whole region of the image information.

Figure 2:
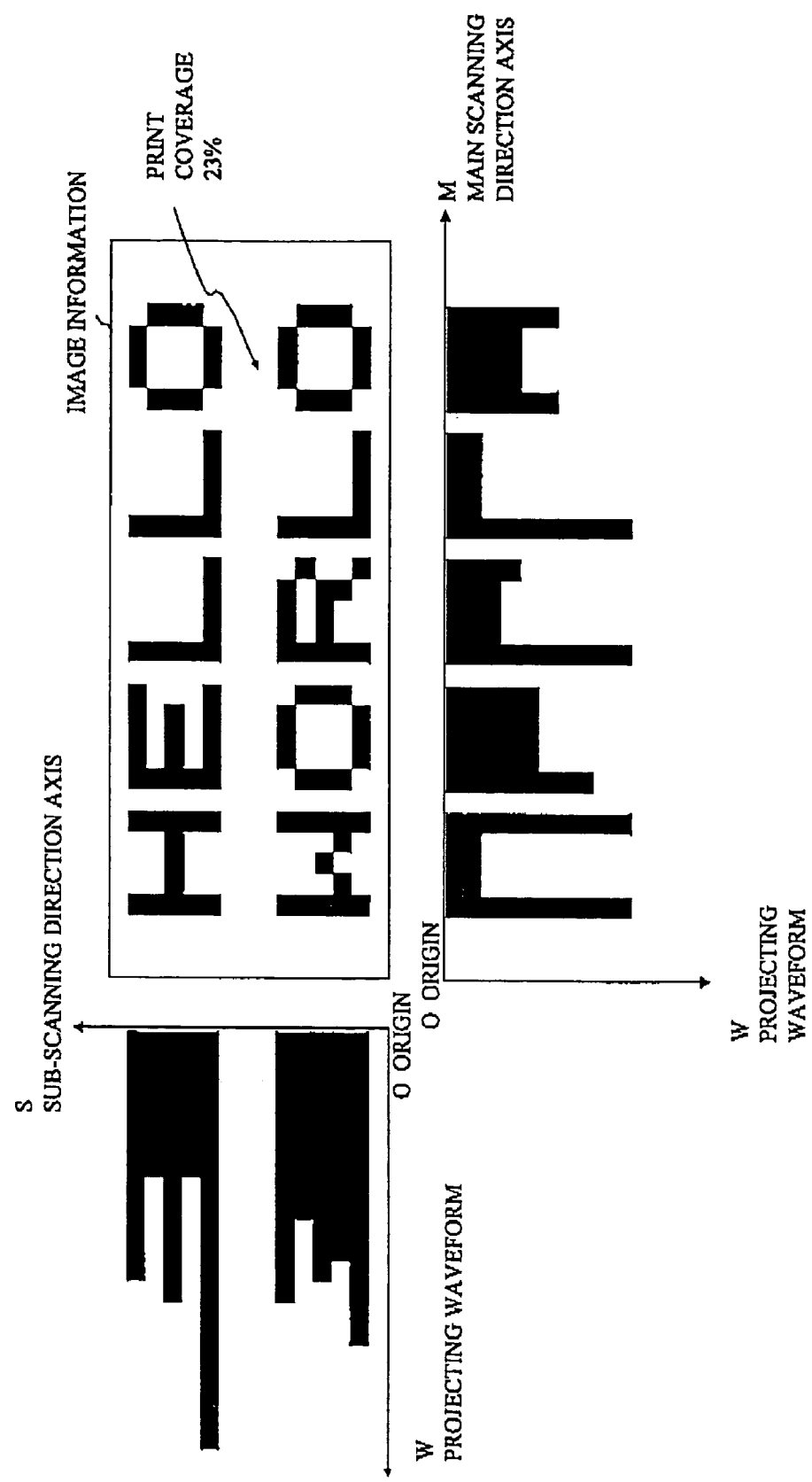
FIG. 2 is a diagram showing a relation between image information and a projecting waveform.

A description will be given of a method of reducing the information amount of the image information with reference to FIG. 2. FIG. 2 is a diagram showing a relation between the image information and a projecting waveform.

FIG. 2 shows the image information, a tone value projecting waveform in the main scanning direction and a tone value projecting waveform in the sub-scanning direction obtained from the image information.

Here, when the total number of pixels of the image information is greater than 4, the sum of the information amounts of the tone value projecting waveform in the main scanning direction and that in the sub-scanning direction is smaller than the information amount of the image information. Therefore, the tone value projecting-waveform in the main scanning direction and that in the sub-scanning direction can be said as reduced information in which the information amount of the image information or the like is reduced.

Figure 3:
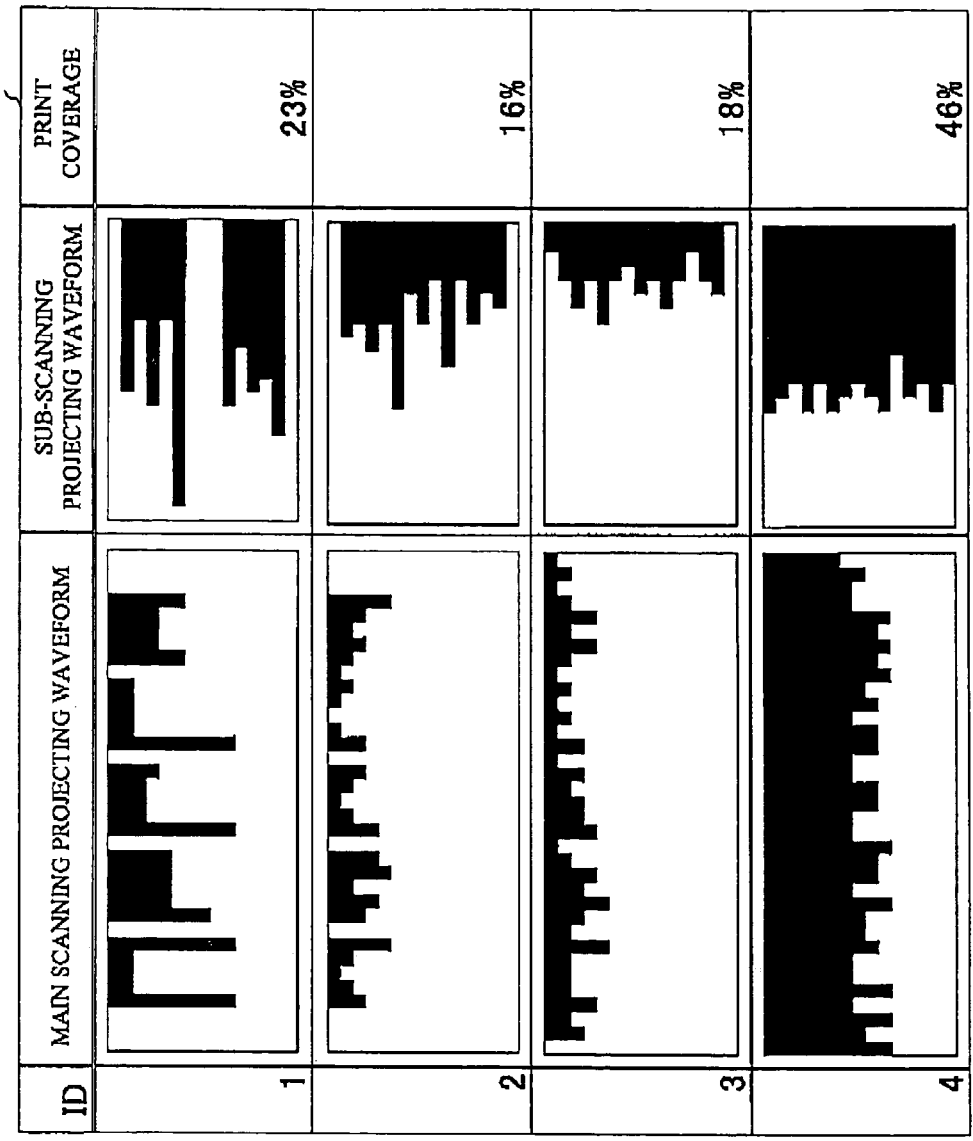
FIG. 3 is a diagram showing an example of a relation between output image reduction information and output image print coverage, which are stored in a memory.

Next, a description will be given of a relation between the output image reduction information and the output image print coverage, which are stored in the memory 170 with reference to FIG. 3. FIG. 3 is a diagram showing an example of a relation between the output image reduction information and the output image print coverage, which are stored in the memory 170.

A history chart TH shown in FIG. 3 stores and associates information for identifying the output image output from the print engine portion 120, the tone value projecting waveform in the main scanning direction and that in the sub-scanning direction, which are pieces of the output image reduction information of the output image, and the output image print coverage.

The parameter calculating portion 180 calculates the tone value projecting waveform in the main scanning direction and that in the sub-scanning direction and the print coverage of the image information obtained by the image obtaining portion 110, the network interface portion 190, or the like.

The network interface portion 190 is composed of, for example, a network adapter or the like. The network interface portion 190 may obtain the image information and an execution instruction through a network.

The characteristic value calculating portion 200 calculates a characteristic value of the projecting waveform by use of differential information between read-in image reduction information, in which the information amount of the read-in image information obtained by the image obtaining portion 110 is reduced, and fundamental image reduction information stored in the memory 170.

The fundamental image reduction information denotes information in which the information amount of fundamental image information is reduced. The fundamental image information denotes image information serving as a fundamental to the output image.

The defect type group determining portion 210, described later, determines a defect type group which is a group of defect types of elements included in the output image during a clustering process based on characteristic values calculated by the characteristic value calculating portion 200.

Furthermore, the defect type group determining portion 210 determines that the defect type included in the output image is a texture stain based on a difference between a read-in image print coverage, which is a print coverage calculated with the use of the read-in image information, and a fundamental image print coverage stored in the memory 170. The fundamental image print coverage denotes a print coverage representing a ratio of a print region to the whole region of the basic image information.

Figure 4:
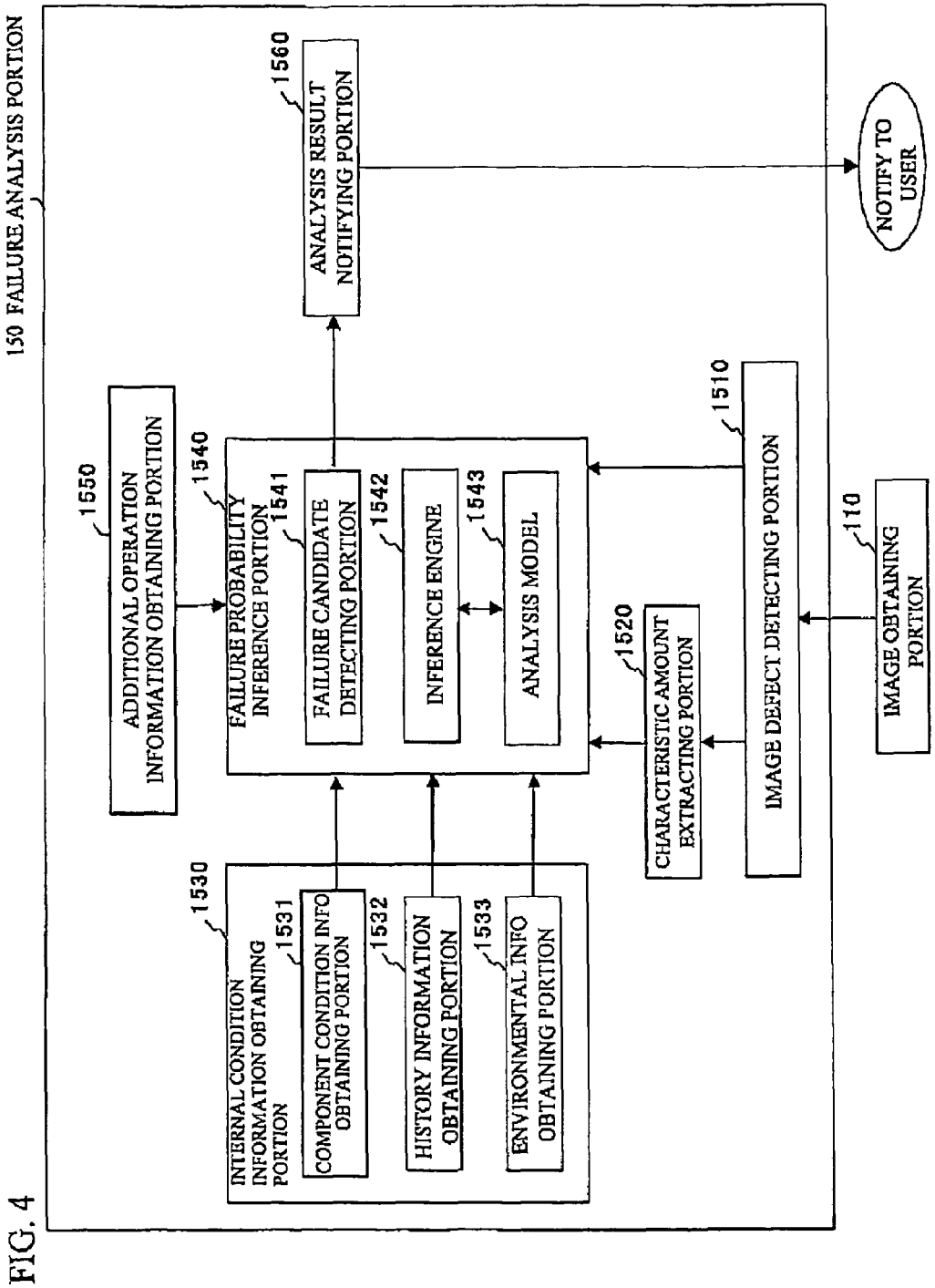
FIG. 4 is a block diagram showing an example of the structure of a failure analysis portion.

A description will now be given of a structure of the failure analysis portion 150 with reference to FIG. 4. FIG. 4 is a block diagram showing an example of the structure of the failure analysis portion 150.

The failure analysis portion 150 is composed of: an image defect detecting portion 1510 serving as an image defect detecting portion; a characteristic amount extracting portion 1520 serving as a characteristic extracting portion: an internal condition information obtaining portion 1530 serving as an internal condition information obtaining portion; a failure probability inference portion 1540; an additional operation information obtaining portion 1550; an analysis result notifying portion 1560; and the like.

The image defect detecting portion 1510 receives the image information from the image obtaining portion 110.

Next, the image defect detecting portion 1510 determines the image defect type based on the received image information.

Specifically, the image defect detecting portion 1510 analyzes the defect of the output image by comparing a reference image for checking, which corresponds to the defect type group determined by the defect type group determining portion 210, and an image to be checked, which is obtained by optically reading the reference image output from the image forming apparatus 100.

Then, the image defect detecting portion 1510 transmits the determined defect type to the controller 160, the characteristic amount extracting portion 1520, and the failure probability inference portion 1540.

The characteristic amount extracting portion 1520 extracts various characteristic amounts which characterize the defect of the output image from the result of the defect type determined by the image defect detecting portion 1510. Here, the characteristic amount extracting portion 1520 extracts the characteristic amounts such as a shape, size, density, outline state, direction of the defect, and periodicity in accordance with the defect type.

The internal condition information obtaining portion 1530 is composed of: a component condition information obtaining portion 1531; a history information obtaining portion 1532; and an environmental information obtaining portion 1533. The internal condition information obtaining portion 1530 may obtain various information in the image forming apparatus 100 which is obtained by the sensor portion 130 and input to the failure analysis model 1543. Then, the internal condition information obtaining portion 1530 transmits the obtained information to the failure probability inference portion 1540.

The component condition information obtaining portion 1531 obtains, as observation data information, component information representing an operation state of each component based on the internal condition information of the image forming apparatus 100, the internal condition information being obtained by the sensor portion 130.

The history information obtaining portion 1532 obtains, as history information, a monitoring result of a status of use of the image forming apparatus 100. The environmental information obtaining portion 1533 directly obtains environmental information inside the image forming apparatus 100, or obtains the environmental information inside the image forming apparatus 100, the environmental information being obtained by the sensor portion 130.

In accordance with the above-described configuration, extracting the characteristic amount and obtaining the internal condition information are not performed by a user. Therefore, the efficiency can be improved, since a user no longer inputs the defect information every time. In addition, detailed and precise analysis is available without professional knowledge on the apparatus.

The failure probability inference portion 1540 calculates the failure probability of a failure cause on each model based on the analysis model 1543 corresponding to the defect type determined by the image defect detecting portion 1510, on the basis of the information obtained by the component condition information obtaining portion 1531, the history information obtaining portion 1532, the environmental information obtaining portion 1533, the characteristic amount extracting portion 1520, and the additional operation information obtaining portion 1550.

In addition, the failure probability inference portion 1540 may be composed of: a failure candidate detecting portion 1541; an inference engine 1542; an analysis model 1543; and the like.

The failure candidate detecting portion 1541 narrows down the failure cause candidates based on the failure cause probability calculated by the inference engine 1542 described later.

The inference engine 1542 calculates the probability that each cause candidate of the failure is the main reason for the failure, namely, failure cause probability, based on the information obtained by the internal condition information obtaining portion 1530, the information obtained by the additional operation information obtaining portion 1550, and the information obtained by the characteristic amount extracting portion 1520.

The analysis model 1543 is one or a plurality of failure analysis models, described later. The analysis model corresponding to the defect type determined by the image defect detecting portion 1510 is used for calculating the failure cause possibility.

The inference engine 1542 for calculating the failure cause probability utilizes Bayesian Network. The Bayesian Network is used for representing a problem region with complex causal relations as a network having a graph structure by sequentially connecting causal relations between a plurality of variables. The Bayesian Network represents a dependency relation between variables by a directed graph. The failure analysis model used according to an aspect of the present invention is structured by using the Bayesian Network.

Here, the failure analysis model, the image forming apparatus 100, and the like employed according to an aspect of the present invention, may utilize an existing failure analysis model, an existing image forming apparatus, and the like.

The additional operation information obtaining portion 1550 obtains failure information in a state of different operation conditions by a user's operation.

The analysis result notifying portion 1560 is composed of, for example, a display device such as a control panel. The analysis result notifying portion 1560 notifies the failure cause candidate extracted by the failure candidate extracting portion 1541, to a user.

Figure 5:
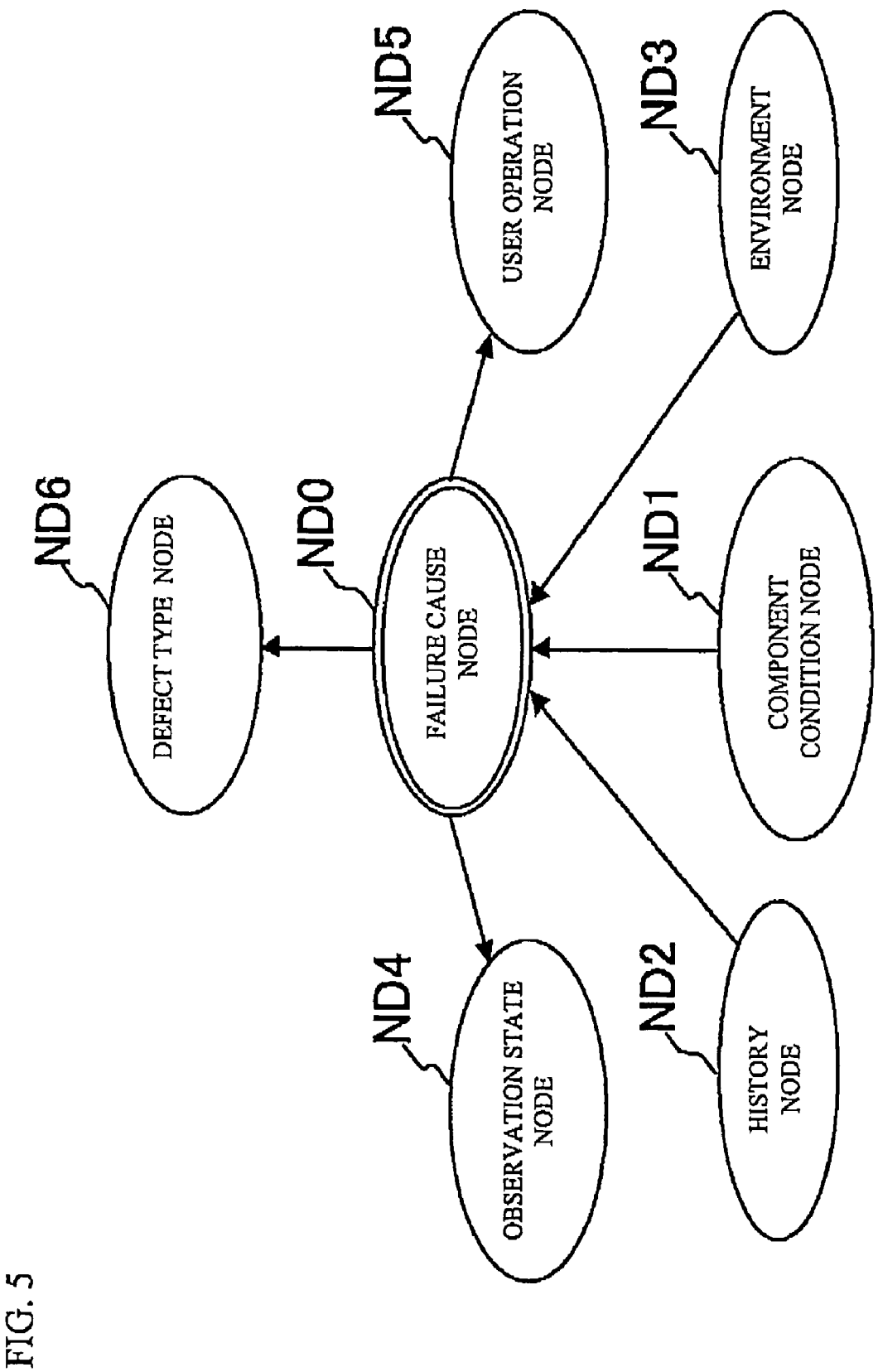
FIG. 5 is a conceptual diagram showing an example of the structure of Bayesian Network at the time of performing an image defect type of failure analysis.

Next, a description will now be given of a structure of the Bayesian Network at the time of performing an image defect type of failure analysis with reference to FIG. 5. FIG. 5 is a conceptual diagram showing an example of the structure of Bayesian Network at the time of performing the image defect type of failure analysis.

As shown in the figure, the Bayesian Network includes a failure cause node ND0 representing the reason for the image defect, a component condition node ND1 representing the state information on a member (component) composing the image forming apparatus, a history information node ND2 representing the history information on the image forming apparatus 100, an environmental information node ND3 representing the information on the surrounding environment in which the image forming apparatus 100 is installed, an observation state node ND4 representing the state information on the image quality defect, a user operation node ND5 representing the additional test result information obtained by a user's operation, and a defect type node ND6.

The failure cause node ND0 is a node representing the cause for the image defect. Whether or not there is a failure is determined by calculating the probability of such node. Each node stores a probability chart table that includes probability data representing the magnitude of the causal relation. The initial value of the probability data may be determined by using data in the past failures and Mean Time Between Failure (MTBF) of the component.

The component condition node ND1 is a node representing the state of the component. The component condition node ND1 is information obtained from the sensor portion 130 monitoring the state of the component. The above-described information may include the temperature of the component, applied voltage, patch density, color material (for example, toner) remaining amount, and the like.

The history information node ND2 represents the status of use of the image forming apparatus 100. For example, a history of the number of printouts for each component is used. The number of printouts directly affects the state of the component such as abrasion or deterioration of the component.

The environmental information node ND3 represents surrounding environment conditions that affect the state of the component. In the present exemplary embodiment, the information node ND3 corresponds to the temperature and humidity. The temperature and the humidity affect image forming conditions and operation conditions of each component.

The observation state node ND4 represents the observation state of the defect existing at the output image, the observation state being information observed and input from a user. For example, the information may include, for example, a shape, size, density, outline, direction, position, periodicity, region, or the like of the defect.

The user operation node ND5 is information that causes the image forming apparatus 100 to execute a similar process after changing the operation condition, and includes information on the operation conditions subsequent to the change.

The defect type node ND6 represents the type of the image defect, and include information such as a line, dot, unprinted section, density unevenness, or the like. Firstly, the type of the image defect is determined to establish the state of this node. Then, information on other nodes (ND1 to ND5) is inputted as necessary to perform an analysis and infer the failure cause.

Each node is connected in such a manner that a relation of "cause" to "result" can be established. For example, the relation between the "failure cause node" and the "observation state node ND4" is a relation that the "observation state (for example, low density, line, strip or the like)" represented by the "observation state node ND4" is shown resulting from the "reason" represented by the "failure cause node". Meanwhile, the relation between the "history information node ND2" and the "cause node" establishes the relation that the "state based on the history information (for example, a large number of copies, long operation years, and the like) results in the occurrence of "cause" (for example, component deterioration and the like).

Figure 6:
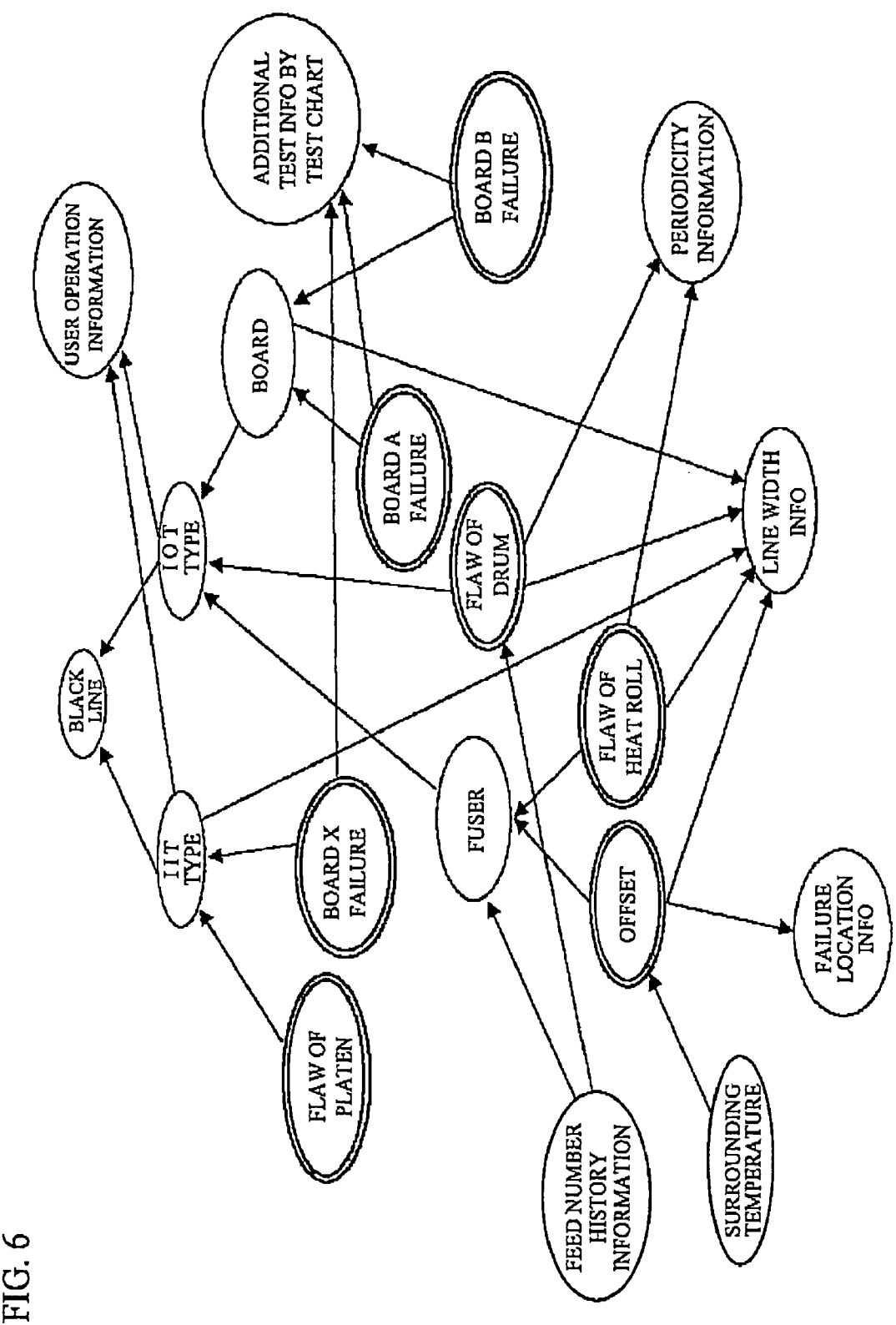
FIG. 6 is a diagram showing an example of the Bayesian Network in the case where a black line occurs in a structural example of the failure analysis due to the image defect.

Referring now to FIG. 6, a description will be hereinafter given of a specific case of the failure analysis model in the failure analysis system, FIG. 6 is a diagram showing an example of the Bayesian Network in the case where a black line occurs in a structural example of the failure analysis due to the image defect.

As shown, the nodes are connected so that the relation of "cause" to "result" is established. For example, the relation between "flaw of a drum" and "line width information" becomes a relation that "line width information" such as a thin line is caused by the "flaw of a drum".

Meanwhile, the relation between "feed number history information" and "fuser" becomes a relation that a state based on "feed number" (feed number equals to or more than a given number) results in a higher possibility that a black line is caused by the deterioration of the "fuser".

The initial value of the probability data of each node is determined based on, for example, the data in the past. After that, the probability of each node may be updated regularly based on statistic data of troubles in the market such as a frequency of replacing the component, frequency of problem occurrence, or the like. Also, states of nodes in FIG. 5, which show characteristics of the image defect such as the "line width information", "periodicity information", and "location information" are determined based on the characteristic amounts obtained by the characteristic amount extracting portion 1520 of FIG. 4.

Figure 7:
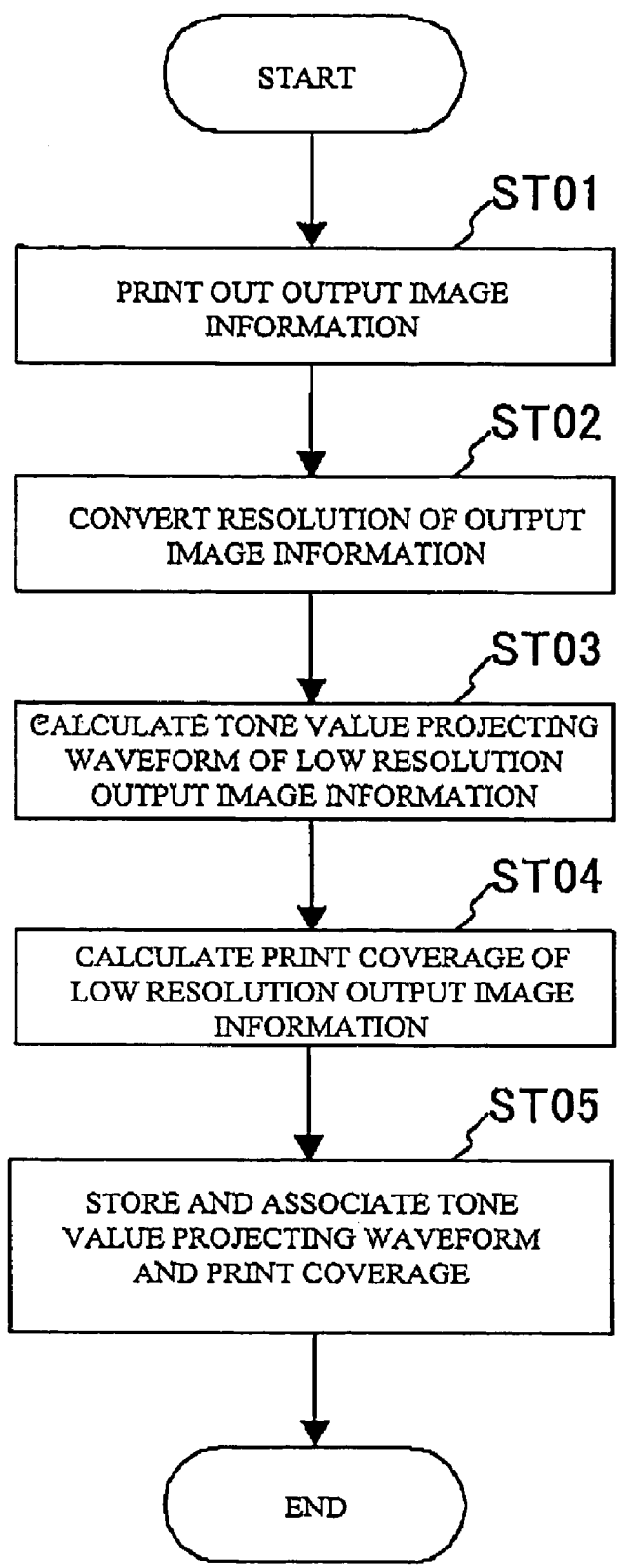
FIG. 7 is a flowchart showing an example of an output control process executed by the controller.

Referring now to FIG. 7, a description will now be given of a control process in outputting the image information executed by the controller 160 (hereinafter simply referred to as output control process). FIG. 7 is a flowchart showing an example of the output control process executed by the controller 160.

Firstly, the controller 160 gives an instruction to the print engine portion 120 to print out output image information (step ST01).

Next, the controller 160 gives an instruction to the parameter calculating portion 180 to convert the resolution of the output image information to a lower one than that of the output image information (step ST02). The image information obtained by the conversion in this step is referred to as low-resolution output image information.

After that, the controller 160 gives an instruction to the parameter calculating portion 180 to calculate the tone value projecting waveform in the main scanning direction and that in the sub-scanning direction with the use of the low-resolution output image information (step ST03).

Then, the controller 160 gives an instruction to the parameter calculating portion 180 to calculate the output image print coverage with the use of the low-resolution output image information (step ST04).

Subsequently, the controller 160 causes to be stored and associated in the memory 170, the information for identifying the output image information and the tone value projecting waveforms in the main scanning direction and that in the sub-scanning direction, and the output image print coverage, which are calculated by the parameter calculating portion 180 (step ST05).

According to the above-described configuration, the data amount of the projecting waveform is smaller than the data amount of the image information. For example, as compared to the case where the output image information is stored in the memory 170, the memory resource to be used can be saved.

Figure 8:
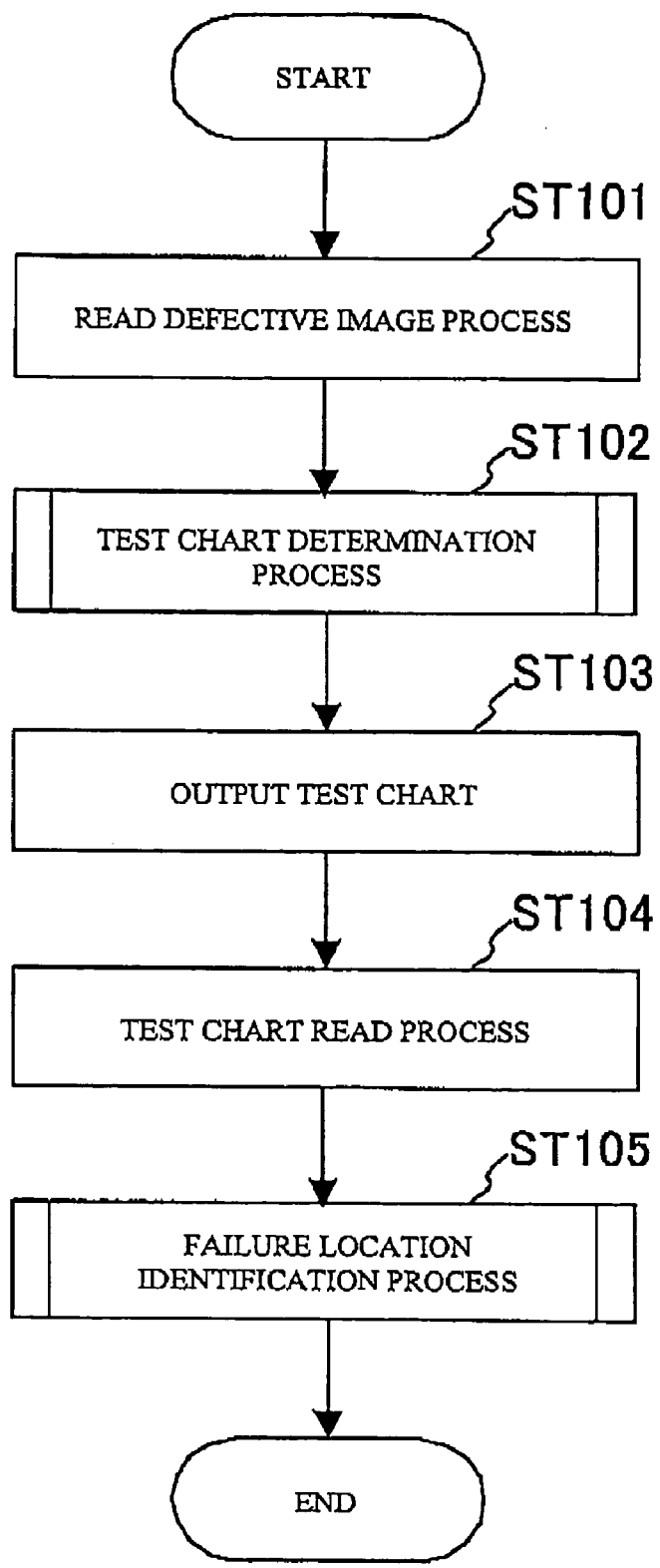
FIG. 8 is a flowchart showing an example of a failure analysis process executed by the controller.

Next, referring to FIG. 8, a description will be given of a control process in the failure analysis executed by the controller 160 (hereinafter, simply referred to as failure analysis process). FIG. 8 is a flowchart showing an example of the failure analysis process executed by the controller 160.

Firstly, the controller 160 gives an instruction to the image obtaining portion 110 to read a defective image, after the image having a defect is set in the image obtaining portion 110, the image being an output image output from the controller 160 (step ST101).

Next, the controller 160 executes a process (hereinafter, simply referred to as test chart determination processing) for determining the reference image for checking (hereinafter, simply referred to as test chart) most suitable for the failure analysis, by analyzing the defective image read in step ST101 (step ST102).

After that, the controller 160 is shifted to a failure analysis mode and receives an instruction to output a test pattern. Then, the controller 160 instructs the print engine portion 120 to print out the test chart determined in step ST102 (step ST103).

The test pattern output here is previously retained in the print engine portion 120 shown in FIG. 1. If the cause for the fail tire exists in a component of the print engine portion 120, the defect does not reappear in the test pattern. Meanwhile, if the cause exists in a component of the image obtaining portion 110 such as a problem occurring only in copying, the defect does not reappear in the test pattern. However, if the cause exists in a component of the image obtaining portion 110, the defect appears in the read-in image by setting the test pattern in the image obtaining portion 110 to read the output image. Therefore, an inquiry may be made by use of the operation screen to confirm whether the defect occurs only in copying prior to reading the output image, so that a user can selectively input information of the answer to the aforementioned inquiry. Such selected information is obtained from an additional operation information obtaining portion 1550, and the obtained information is input to the failure probability inference portion 207. When the test pattern is ejected from the print engine portion 120 of the image forming apparatus 100, the test pattern is set on the image obtaining portion 110, and a user may input an instruction to read in the test pattern.

Next, the controller 160 gives an instruction to the image obtaining portion 110 to optically read the test chart output to obtain the image to be checked (step ST104).

After that, the controller 160 executes a process for determining the failure location of the image forming apparatus 100 based on the image to be checked or the like, the image being obtained by the image obtaining portion 110 (hereinafter, simply referred to as failure location determination process) (step ST105).

Figure 9:
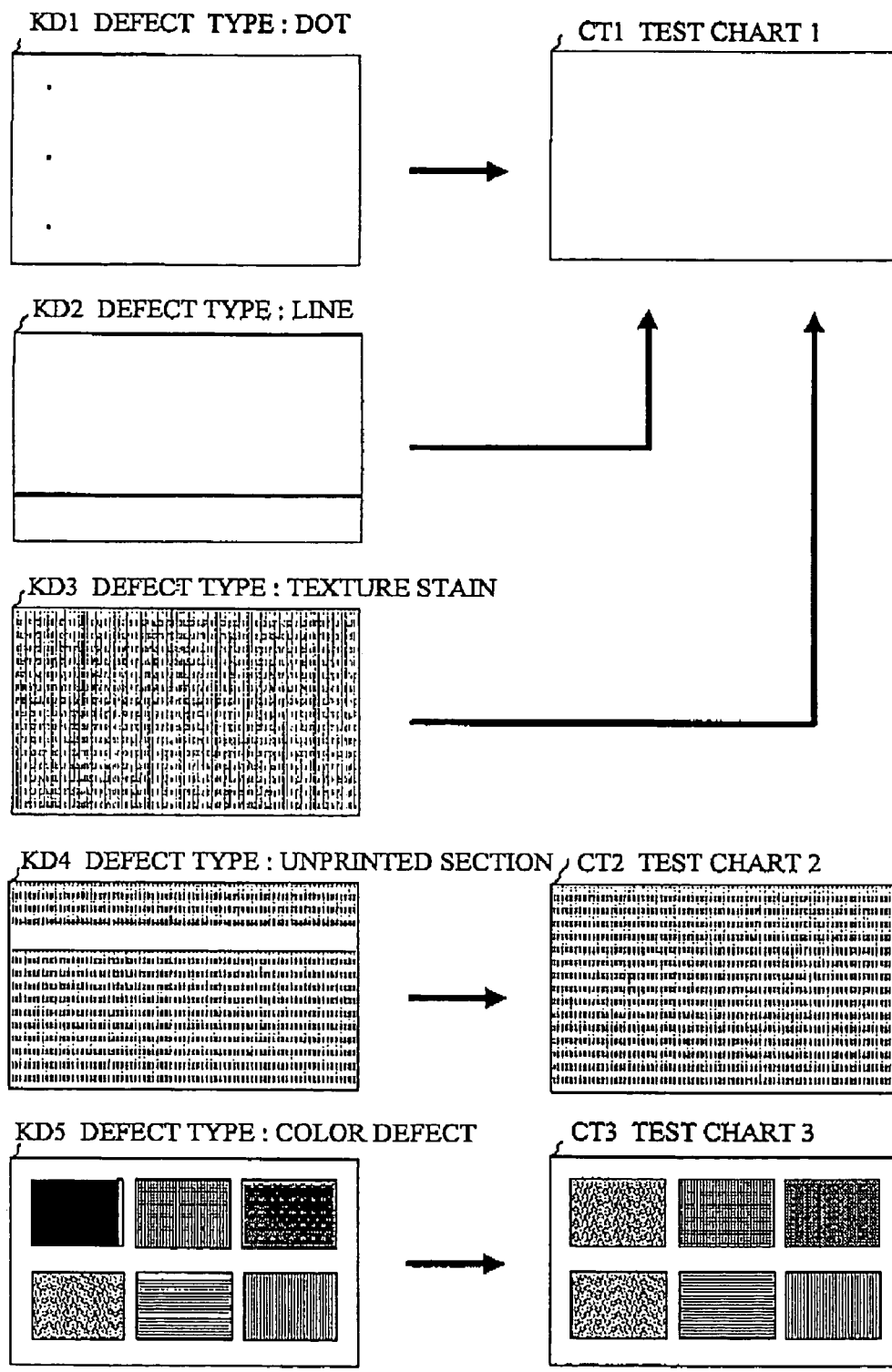
FIG. 9 is a diagram showing an example of the relation between an image defect and a test chart.

A description will now be given of a relation between the image defect and the test chart, with reference to FIG. 9. FIG. 9 is a diagram showing an example of the relation between the image defect and the test chart.

As an image defect type, a dot KD1, a line KD2, a texture stain KD3, an unprinted section KD4, and a color defect KD5 are exemplified.

The dot KD1 being a defect type of the defective image denotes that a dotted image exists in the read-in image information but does not exist in the fundamental image information. Here, the read-in image information refers to image information obtained by reading the output image.

The line KD2 being a defect type of the defective image denotes that a linear image exists in the read-in image information but does not exist in the fundamental image information.

The texture stain KD3 being a defect type of the defective image denotes that a stain image exists nearly the whole read-in image information but does not exist in the fundamental image information.

The unprinted section KD4 being a defect type of the defective image denotes that an image in a specific region of the read-in image information does not exist but exists in the fundamental image information.

The color defect. KD5 being a defect type of the defective image denotes that a specific color of the read-in image information is different from that of the fundamental image information.

In the failure analysis system, if it is determined that the defect type is one of the dot KD1, the line KD2, and the texture stain KD3, a test chart CT1 of a full blank sheet is output from the print engine portion 120.

If it is determined that the defect type is the unprinted section KD4, a test chart CT2 of a fully printed sheet is output from the print engine portion 120.

Figure 10A:
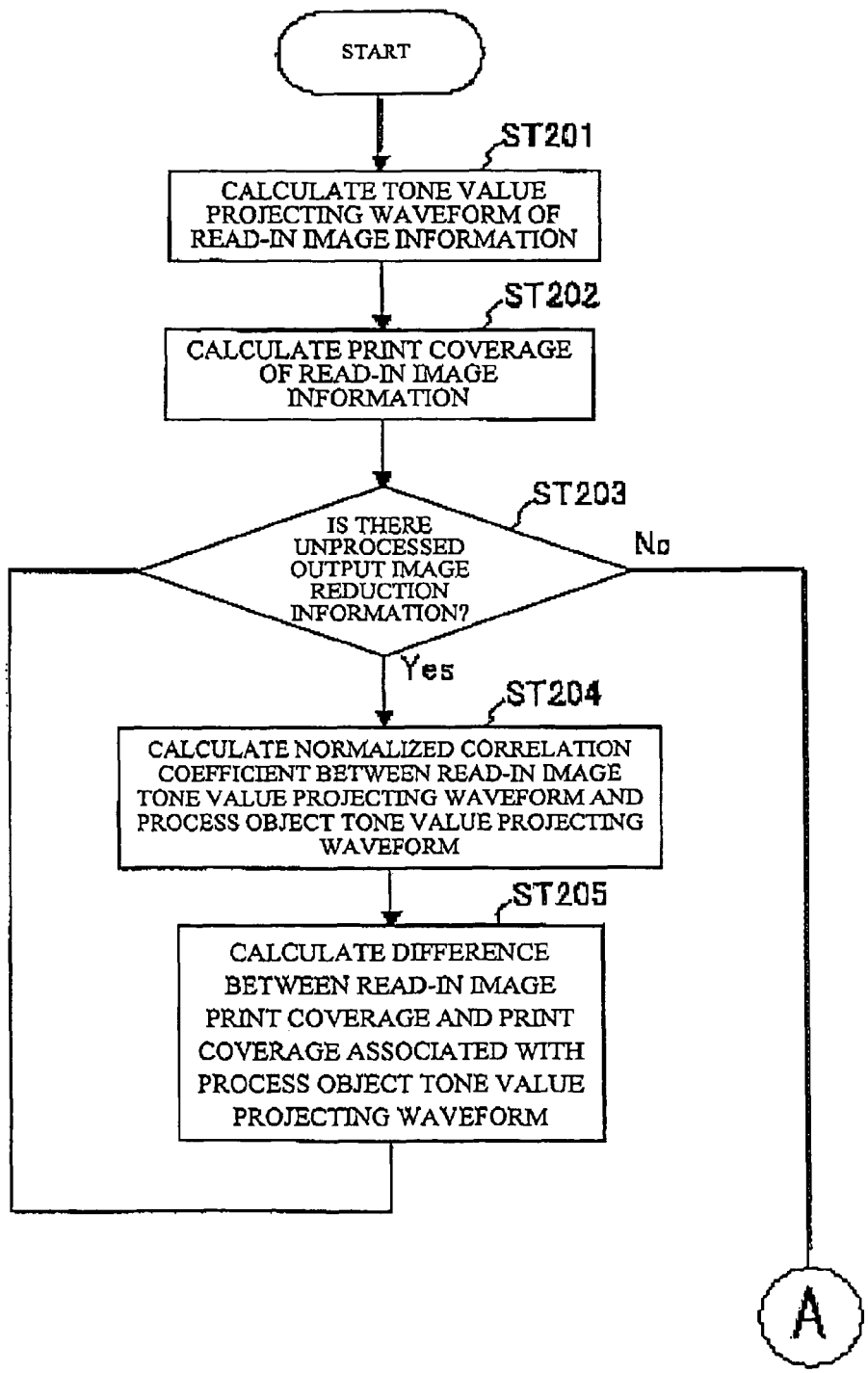
FIG. 10A and FIG. 10B show a flowchart showing an example of a test chart determination process executed by the controller.
Figure 10B:
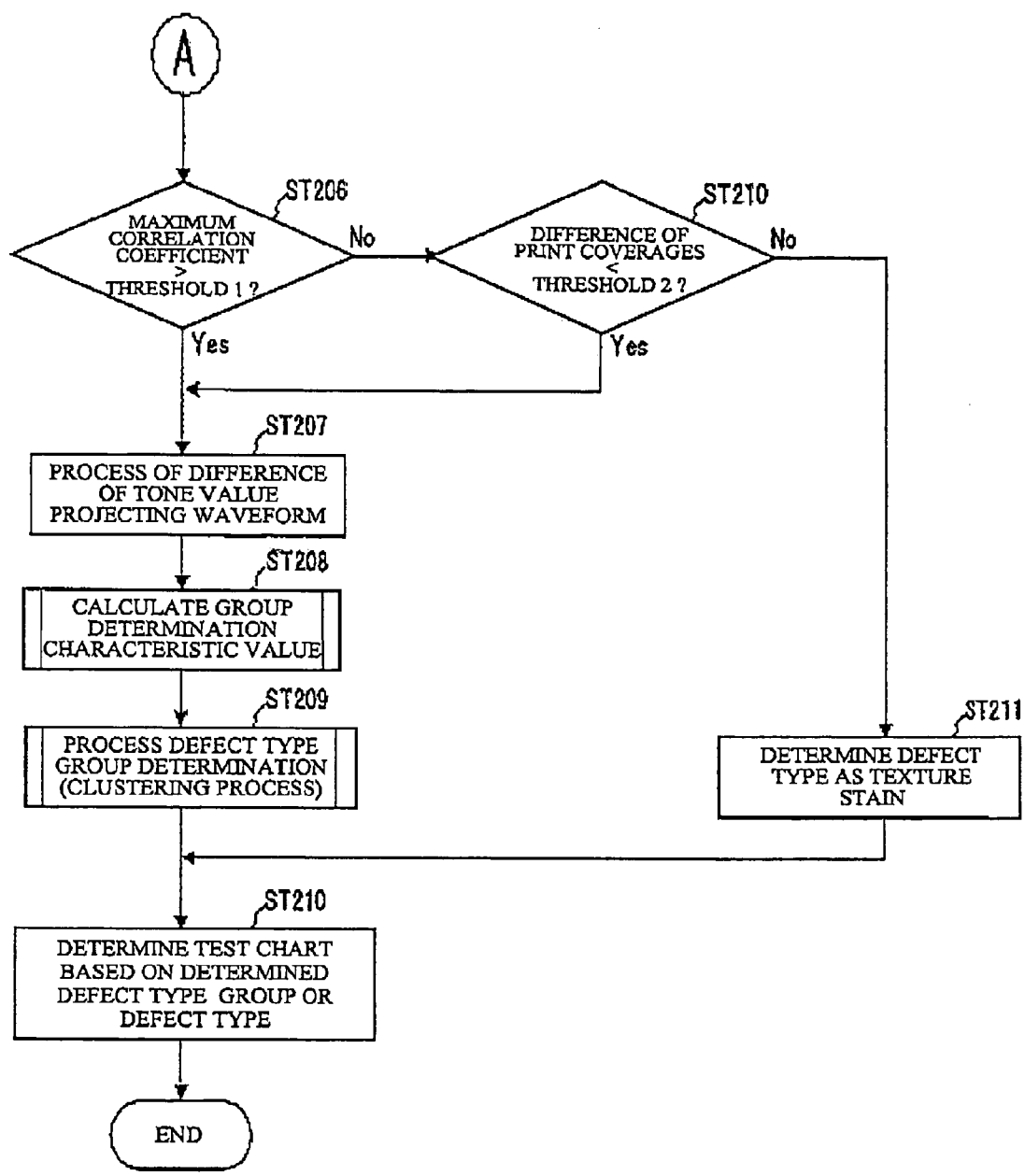

If it is determined that the defect type is the color defect KD5, a test chart CT3 having rectangles colored in various tones and colors is output from the print engine portion 120, Referring now to FIG. 10A and FIG. 10B, a description will now be given of the test chart determination processing shown in step ST102 of FIG. 8. FIG. 10A and FIG. 10B show a flowchart showing an example of a test chart determination process executed by the controller 160.

First, the controller 160 instructs the parameter calculating portion 180 to calculate the tone value projecting waveform of the read-in image information obtained by reading in the defective image in step ST101 of FIG. 8 (step ST201). The tone value projecting waveform of the read-in image information is referred to as read-in image tone value projecting waveform.

Next, the controller 160 gives an instruction to the parameter calculating portion 180 to calculate the print coverage of the read-in image information (read-in image print coverage) (step ST202).

After that, the controller 160 determines whether or not the memory 170 has the output image reduction information, which is not a process object (hereinafter, simply referred to as unprocessed output image reduction information) in step ST204 and step ST205, described later. If it is determined that the unprocessed output image reduction information exists, the controller 160 executes the process of step ST204. If not, the controller 160 executes the process of step ST206.

If it is determined that the unprocessed output image reduction information exists in step ST203, the controller 160 sets one of the unprocessed output image reduction information as a process object. The tone value projecting waveform, which is the output image reduction information set as the process object, is referred to as a process object tone value projecting waveform.

After that, the controller 160 calculates a normalized correlation coefficient between the read-in image tone value projecting waveform calculated in step ST201 and the process object tone value projecting waveform (step ST204).

Next, the controller 160 calculates a difference between the fundamental image print coverage calculated in step ST202 and the print coverage associated with the process object tone value projecting waveform stored in the memory 170 (step ST205). After that, the controller 160 returns to step ST203 and repeats the above-described processing.

If it is determined that the unprocessed output image reduction information does not exist in step ST203, the controller 160 determines whether the correlation coefficient with a maximum value exceeds a given threshold value of 1 (step ST206), the correlation coefficient with a maximum value being selected out of the correlation coefficients calculated in step ST204 (hereinafter, simply referred to as maximum correlation coefficient). Here, the given threshold value of 1 is a positive constant number. If it is determined that the maximum correlation coefficient exceeds the given threshold value of 1, the controller 160 executes the process of step ST207. If not, the controller 160 executes the process of step ST210.

If it is determined that the maximum correlation coefficient exceeds the given threshold value of 1 in step ST206, or if it is determined that the difference of the print coverages is smaller than a threshold value of 2 in step ST210, the controller 160 identifies that the tone value projecting waveform of the output image, which is the output image reduction information having the highest correlation with the read-in image tone value projecting waveform, to be the fundamental image reduction information.

In accordance with the above-described configuration, the fundamental image reduction information is the output image reduction information, and the output image reduction information is stored in the memory. Therefore, the fundamental image reduction information can be obtained out of the output image reduction information.

Also, in accordance with the above-described configuration, the fundamental image reduction information is identified from the output image reduction information, by checking presence of the positive correlation. Therefore, the fundamental image reduction information can be identified from the output image reduction information based on only the information of the output image.

After that, the controller 160 obtains the differential information between the fundamental image reduction information and the read-in image tone value projecting waveform (hereinafter, simply referred to as differential tone value projecting waveform) (step ST207).

Next, the controller 160 gives an instruction to the characteristic value calculating portion 200 to calculate the characteristic value with the use of the tone value projecting waveform obtained in step ST207 (step ST208). The calculation process to be executed by the characteristic value calculating portion 200 based on the instruction notified by the controller 160 in the present step is referred to as group determination characteristic value calculation process.

After that, the controller 160 instructs the defect type group determining portion 210 to determine a defect type group to which the defect included in the output image belongs, by use of a clustering process according to the characteristic value calculated by the characteristic value calculating portion 200 (step ST209). The determination process executed by the defect type group determining portion 210 according to the instruction notified by the controller 160 in the present step is referred to as clustering process.

Subsequent to the execution of step ST209 or step ST211, the controller 160 determines the test chart to be output based on the defect type group determined in step ST209 or the defect type determined in step ST211 (step ST210). After that, the controller 160 ends the processing.

If it is determined that the maximum correlation coefficient does not exceed the given threshold value of 1 in step ST206, the controller 160 determines whether or not the difference between the print coverages obtained in step ST205 is smaller than the given threshold value of 2 (step ST210). If it is determined that the difference of the print coverages is smaller than the given threshold value of 2, the controller 160 executes the process of step ST207. If not, the controller 160 executes the process of step ST211.

In accordance with the above-described configuration, the fundamental image print coverage is the output image print coverage, and the output image print coverage is stored in the memory. Therefore, the fundamental image print coverage can be obtained from the output image print coverage stored.

If it is determined that the difference between the print coverages is equal to or more than the given threshold value of 2, the controller 160 determines that the defect type is a texture stain (step ST211).

In accordance with the above-described configuration, there is a high tendency that, in the texture stain defect; there is a print region, which does not exist in the fundamental image, on the whole region of the output image. Therefore, it is possible to determine whether or not the defect type is the texture stain based on the difference between the print coverages.

Figure 11:
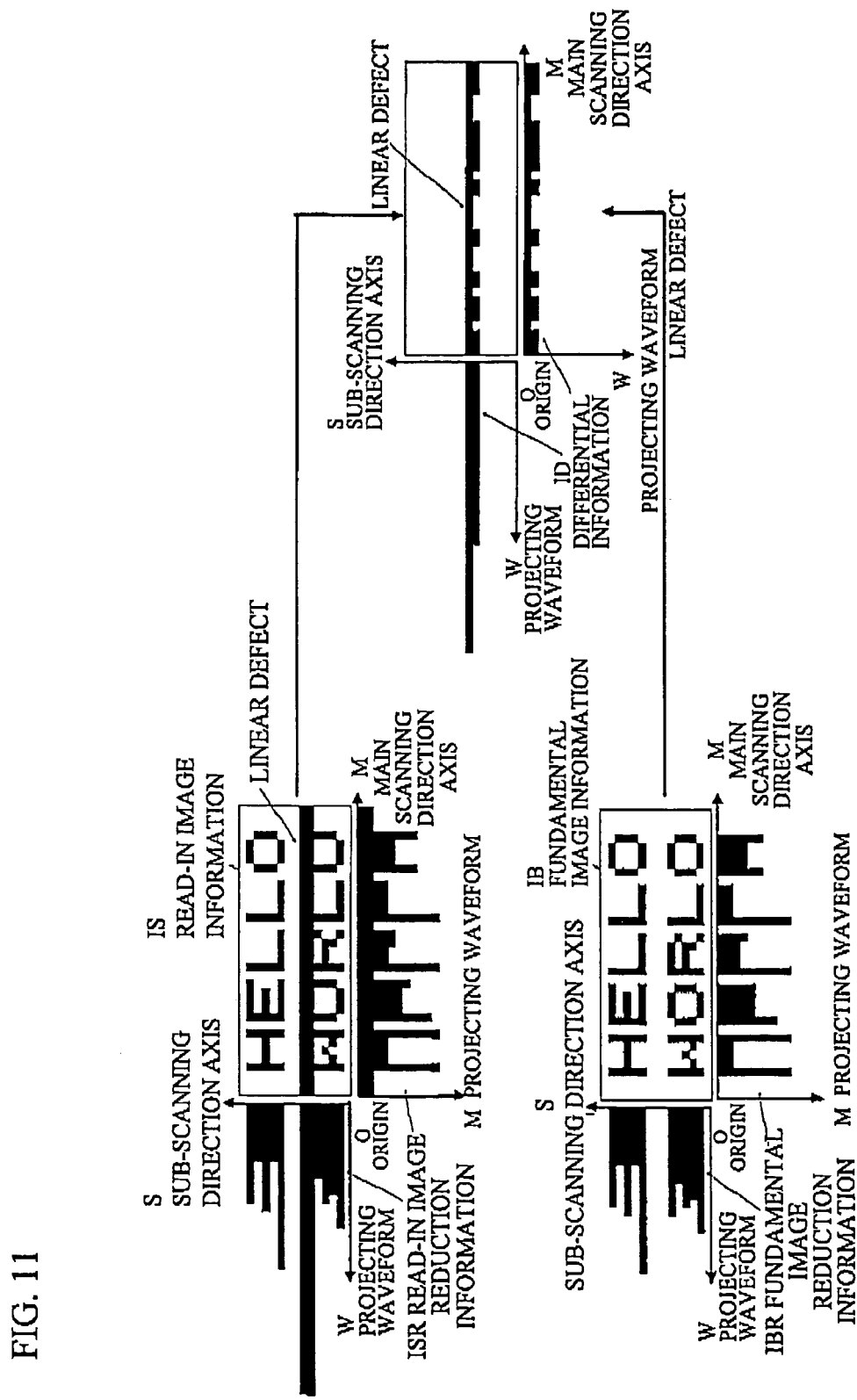
FIG. 11 is a diagram showing an example of a process for obtaining a differential tone value projecting waveform.

A description will be given of a process for obtaining the differential tone value projecting waveform shown in step ST207 of FIG. 10B, with reference to FIG. 11. FIG. 11 is a diagram showing an example of the process for obtaining the differential tone value projecting waveform.

The upper left view of FIG. 11 shows: read-in image information IS having a linear defect obtained by reading in the output image; and tone value projecting waveforms, which are read-in image reduction information ISR obtained from the read-in image information IS.

The lower left view of FIG. 11 shows: fundamental image information IB, which is the output image serving as a fundamental of the output image; and the tone value projecting waveforms, which are fundamental image reduction information IBR obtained from the fundamental image information IB. The fundamental image reduction information IBR is information determined as the output image reduction information having the largest correlation coefficient with the read-in image reduction information ISR out of the output image reduction information stored in the memory 170 in step ST200 of FIG. 10B.

The right figure of FIG. 11 shows the differential tone value projecting waveform, which is a differential information ID between the read-in image reduction information ISR in the upper left figure and the fundamental image reduction information ITR in the lower left figure. The differential tone value projecting waveform represents the tone value projecting waveform resulting from only the image with a linear defect, which is the difference between the read-in image information IS and the fundamental image information IB.

Figure 12:
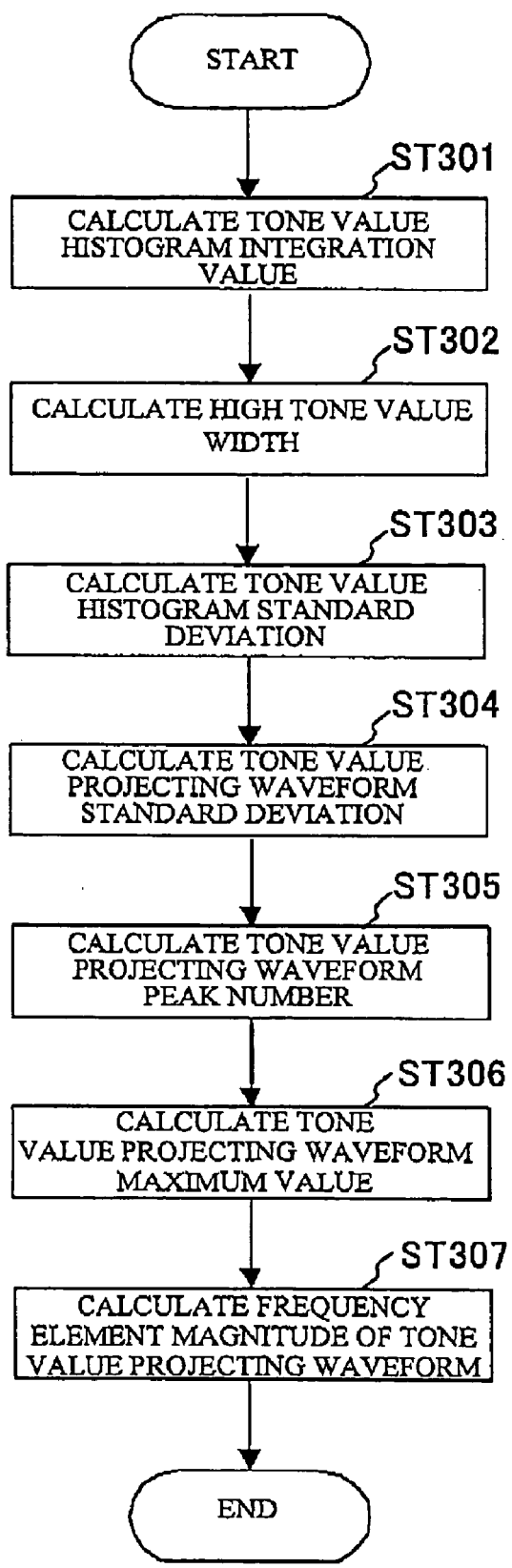
FIG. 12 is a flowchart showing an example of a group determination characteristic value calculation process executed by a characteristic value calculating portion.

Referring to FIG. 12, a description will be given of the group determination characteristic value calculation process in step ST208 of FIG. 10B. FIG. 12 is a flowchart showing an example of the group determination characteristic value calculation process executed by the characteristic value calculating portion 200.

Firstly, the characteristic value calculating portion 200 calculates a group determination value, described below, from multiple values of defective image information obtained by the image obtaining portion 110.

The characteristic value calculating portion 200 calculates an integration value of a tone value histogram of the defective image information (hereinafter, simply referred to as tone value histogram integration value (step ST301).

Next, the characteristic value calculating portion 200 calculates a high tone value width, which is a pixel number at which the tone value exceeds a threshold value in the tone value projecting waveform (step ST302). The high tone value width will be described later.

After that, the characteristic value calculating portion 200 calculates a standard deviation of the tone value histogram (hereinafter, simply referred to as tone value histogram standard deviation) (step ST303).

Next, the characteristic value calculating portion 200 calculates the standard deviation of the tone value projecting waveform (hereinafter, simply referred to as tone value projecting waveform standard deviation) (step ST304).

After that, the characteristic value calculating portion 200 calculates a peak number of the tone value waveform (hereinafter, simply referred to as tone value projecting waveform peak number) (step ST305).

Then, the characteristic value calculating portion 200 calculates a maximum value of the tone value waveform (hereinafter, simply referred to as tone value projecting waveform maximum value) (step ST306).

After that, the characteristic value calculating portion 200 calculates the magnitude of the frequency component of the tone value waveform (hereinafter simply referred to as frequency component magnitude) (step ST307).

Subsequently, the characteristic value calculating portion 200 ends processing.

In accordance with the above-described configuration, it is possible to obtain the characteristic value quantitatively and uniformly representing the characteristics of the defect group including: the size of the defective region by use of the integration value of the tone value histogram; the length of the width in the sub-scanning direction (or in the operation direction) in the defective region, which is expanded in the scanning direction (or sub-operation direction) to the degree of a certain width or more, by use of the high tone value pixel number of the tone value projecting waveform; the amount of tone value unevenness by use of the standard deviation of the tone value histogram and the standard deviation of the tone value projecting waveform; the number of linear defects by use of the peak number of the tone value projecting waveform; the size of the defect tone value by use of the maximum value of the tone value projecting waveform; and the characteristic value quantitatively representing the characteristics of the defect group such as presence of periodic defect occurrence by use of the frequency component magnitude of the tone value projecting waveform. It is therefore possible to determine quantitatively and uniformly which group to which the defect of the test pattern belongs, the group including: "line/vertical line", which is the defect type group of defect types of elements of "dot" and "vertical line"; "line/horizontal line", which is the defect type group of defect types of elements of "dot" and "horizontal line"; "fog" as a defect type; "vertical line/horizontal line/fog", which is the defect type group of defect types of elements of "horizontal line" and "vertical line"; "vertical line", which is the defect type group of defect types of elements of only "vertical line"; and "horizontal line", which is the defect type group of defect types of elements of only "horizontal line". Accordingly, for example, the workload of an operator can be decreased as compared to the method in which the defect type group is identified by inferring the defect of the test pattern and qualitatively or individually obtaining and analyzing the value characterizing the group for each defect type group of the inferred defect types of elements by an operator, and in addition, the precision of determining the defect type group is not affected by the ability level of an operator to infer the defect type group.

The characteristic value calculating portion 200 may have a configuration in which the above-described characteristic value is calculated with the use of the image information of multiple values of differential image between the defective image information (image to be checked) and the image information used when the original document DC having a defect, which is an origin of the defective image information, is output from the print engine portion 120 (check image), instead of the multiple values of the defective image information obtained by the image obtaining portion 110.

Figure 13:
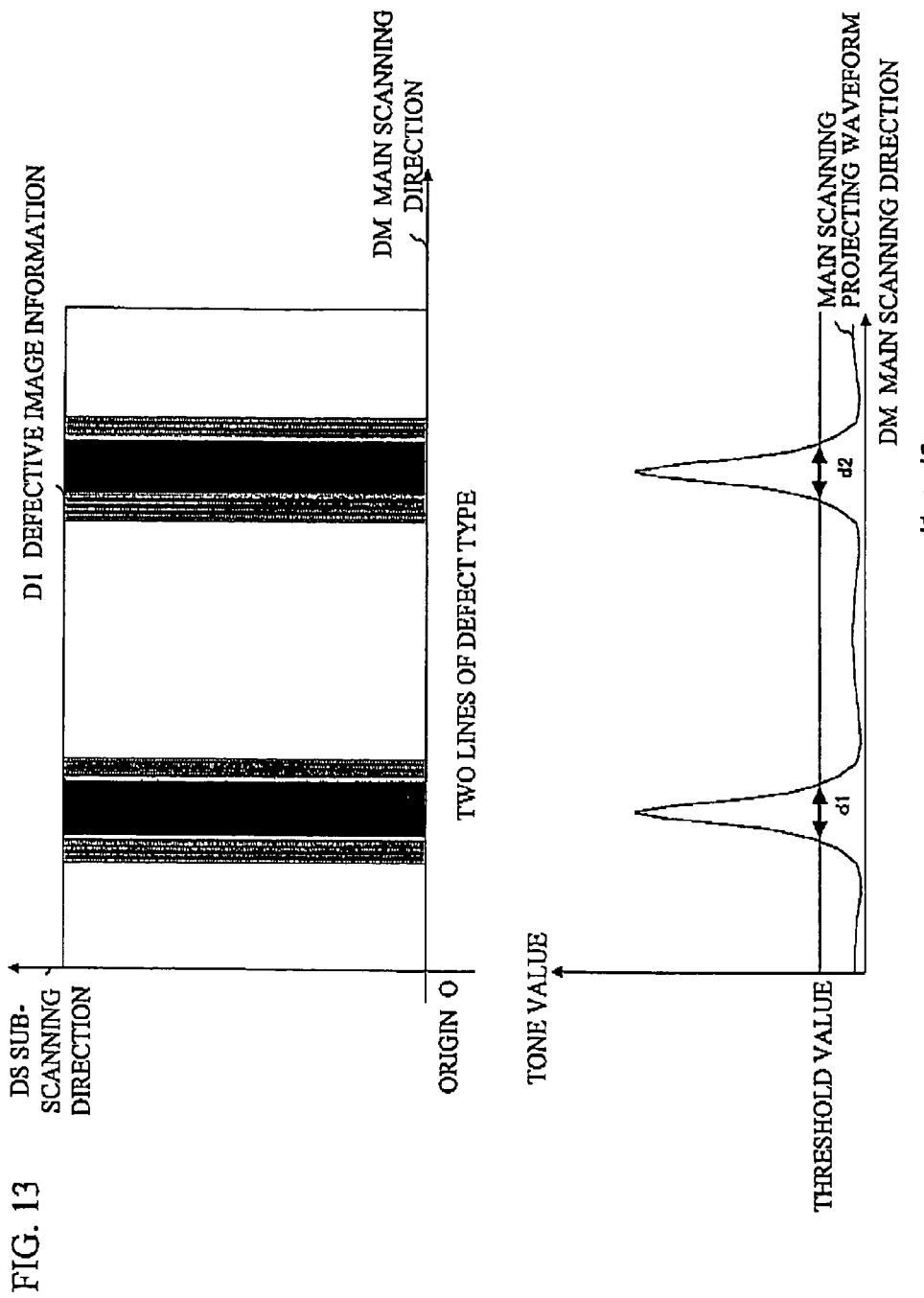
FIG. 13 is a diagram showing the relation between a high tone value width and a threshold value.

Here, referring to FIG. 13, a description will be given of the high tone value width calculated in step ST202 shown in FIG. 12. FIG. 13 is a diagram showing the relation between the high tone value width and the threshold value.

The upper diagram of FIG. 13 shows defective image information DI, which is image information obtained by the image obtaining portion 110, as image information, from the original document DC having a defect output from the print engine portion 120.

The defective image information DI is obtained by the image obtaining portion 110, as image information, from the original document DC having the defect output from the print engine portion 120. The defective image information DI has an image defect composed of two lines. The two lines have the highest density in the central portions thereof. The density becomes lower, as the location thereof is apart from the central portion. In the defective image information DI, there are set coordinate axes of a main scanning direction DM and a sub-scanning direction DS.

The lower diagram of FIG. 13 shows the projecting waveform in the main scanning direction DM of the defective image information DI shown in the upper diagram. The vertical axis represents the average of tone values of the sub-scanning direction per unit distance (for example, pixel) in the scanning direction. The horizontal axis is the coordinate axis of the main scanning direction DM of the defective image information DI shown in the above diagram. In the lower diagram of FIG. 13, the central portion of the two lines is high in the average tone value, and becomes lower in the average tone value lower as the location thereof is apart from the central portion.

In the lower diagram of FIG. 13, a predetermined given threshold value is defined. The high tone value width is calculated as a sum of d1 and d2, which are the widths of the sections where the average tone value exceeds the threshold value in the tone value projecting waveform.

Figure 14:
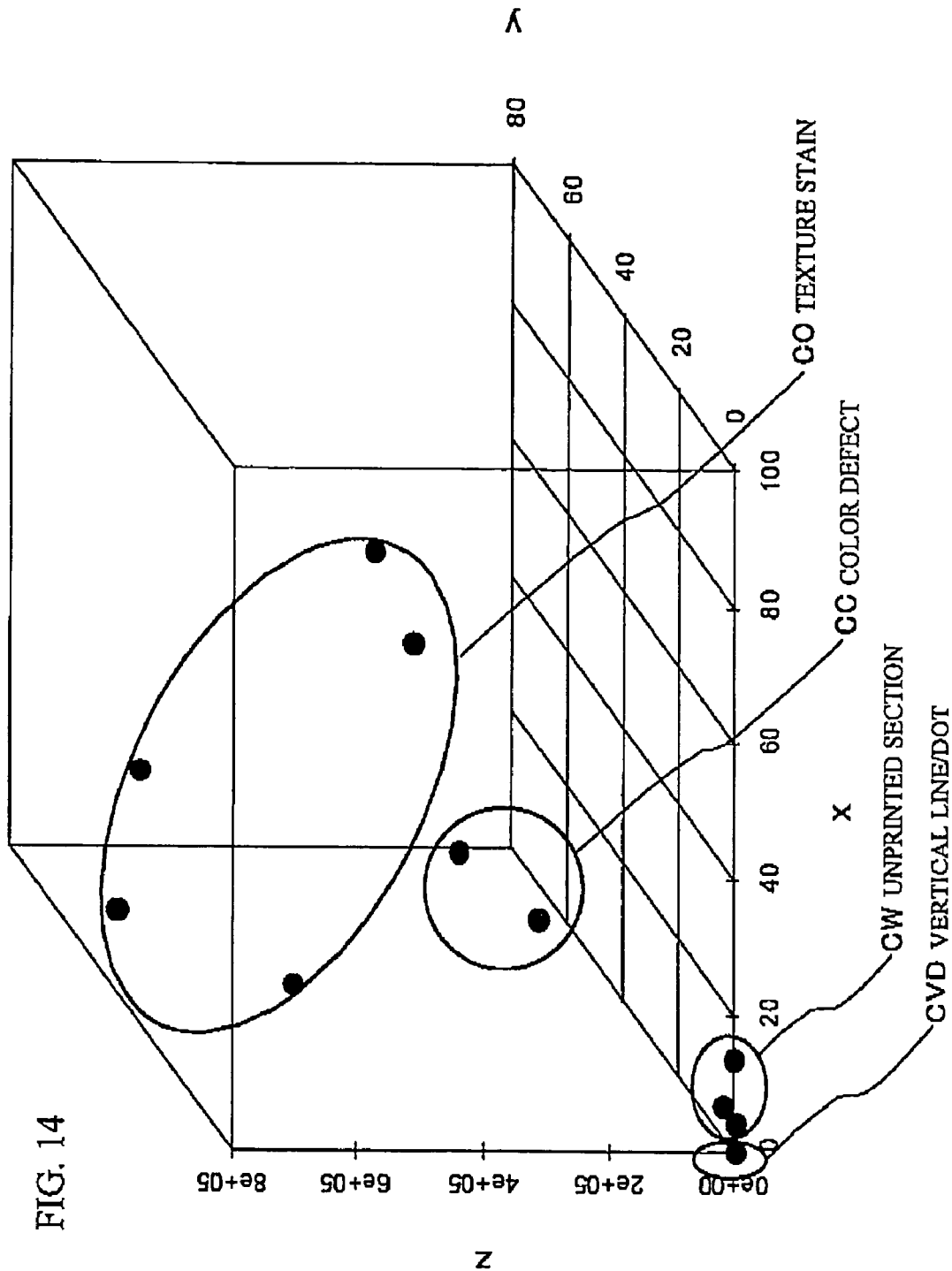
FIG. 14 is a diagram showing the relation between a cluster and a defect type group.

Referring to FIG. 14, a description will be given of the defect type group determination process (clustering process) shown in step ST209 of FIG. 10B. FIG. 14 is a diagram showing the relation between a cluster and a defect type group.

FIG. 14 shows: a line/dot cluster CVD; an unprinted section cluster CW; a color defect cluster CC; and a texture stain cluster CO, the vertical line/dot cluster CVD being composed of a coordinate group represented by the group determination characteristic value calculated when the defect type observed in the past is a vertical line or a dot, the unprinted section cluster CW being composed of a coordinate group represented by the group determination characteristic value calculated when the defect type is only an unprinted section, the color defect cluster CC being composed of a coordinate group represented by the group determination characteristic value calculated when the defect type is only the color defect, the texture stain cluster CO being composed of a coordinate group represented by the group determination characteristic value calculated when the defect type is a texture stain.

In addition, the vertical line/dot cluster CVD corresponds to a vertical line/dot group GHVO, the unprinted section cluster CW corresponds to an unprinted section group SW, the color defect cluster CC corresponds to a color defect group GC, and the texture stain cluster corresponds to a texture stain group GO, respectively.

Therefore, the vertical line/dot group GHVO, which is a defect type group, has a vertical line or a dot, which are defect types. The unprinted section group GW has only an unprinted section, which is a defect type. The color defect group GC has only a color defect, which is a defect type. The texture stain group GO, which is a defect type group, has only a texture stain, which is a defect type.

For simplification, FIG. 14 shows a view in the three-dimensional coordinate space, but in practice, the present invention is not limited to the three-dimensional coordinate space. In the present exemplary embodiment, there is employed a multi-dimensional coordinate space represented by coordinate axes respectively corresponding to the tone value histogram integration value, the high tone value width, the tone value histogram standard deviation, the tone value projecting waveform standard deviation, the tone value projecting waveform peak number, the tone value projecting waveform maximum value, and the frequency component magnitude, which are adopted as group determination characteristic values.

Figure 15:
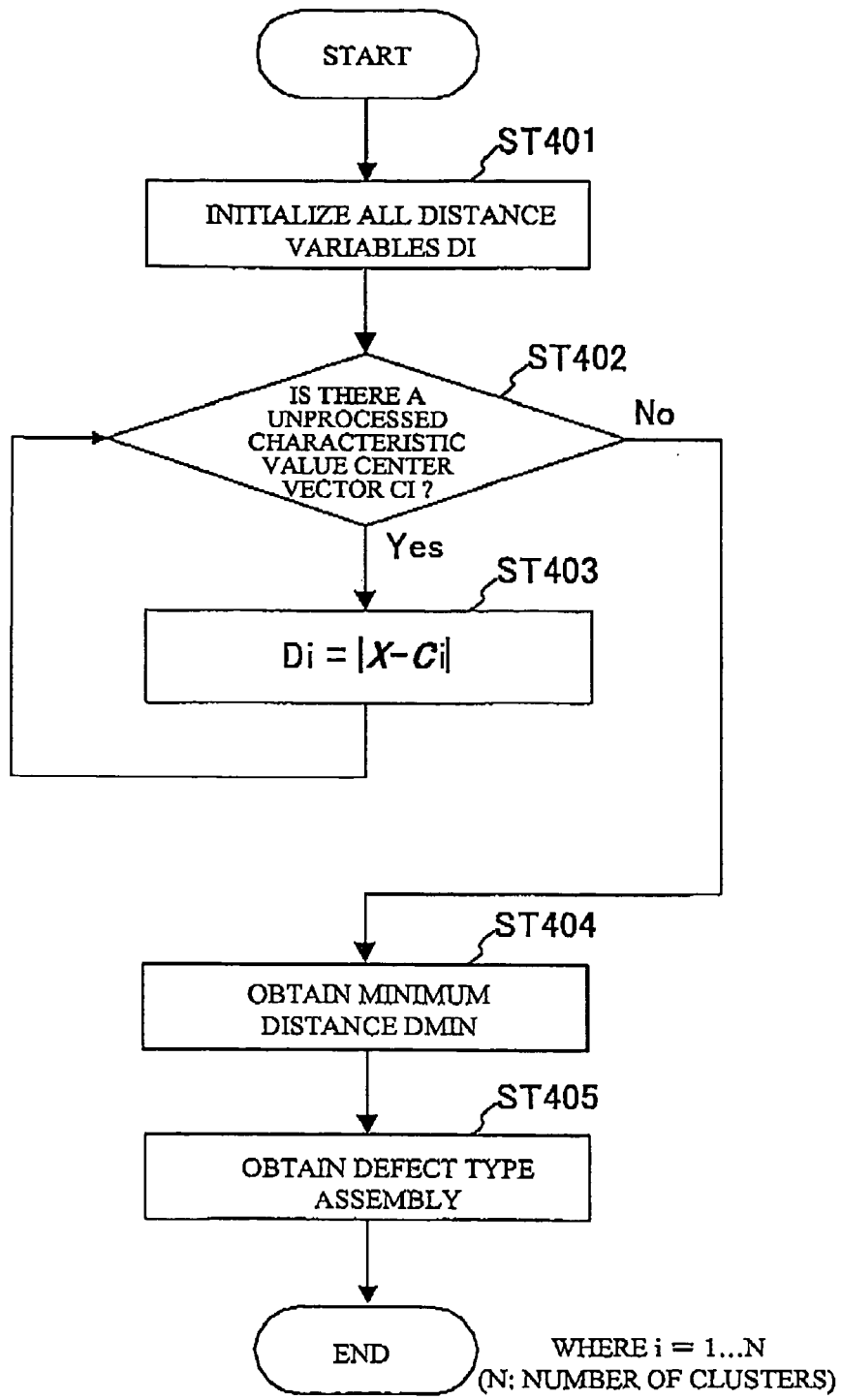
FIG. 15 is a flowchart showing a clustering process executed by a defect type group determining portion.

Referring now to FIG. 15, a description will be given of a defect type group determination process (clustering process) shown in step ST209 of FIG. 10B. FIG. 15 is a flowchart showing a clustering process executed by the defect type group determining portion 210.

Firstly, the defect type group determining portion 210 initializes a distance variable Di between a cluster center vector Ci and an group determination characteristic value vector X for all clusters (step ST401). Here, i is an integer number from 1 to n. n is the number of clusters.

Here, the cluster center vector Ci denotes the center of the smallest sphere including the coordinate group represented by the group determination characteristic value of the image defect observed in the past, the coordinate group composing a cluster.

The group determination characteristic value vector X denotes a vector of the tone value histogram integration value, the high tone value width, the tone value histogram standard deviation, the tone value projecting waveform standard deviation, the tone value projecting waveform peak number, the tone value projecting waveform maximum value, and the frequency component magnitude, which are group determination characteristic values calculated by the characteristic value calculating portion 200.

Also, the distance Di between the group determination characteristic value vector X and the center vector Ci is defined by Mahalanobis distance between the group determination characteristic value vector X and the center vector Ci.

Next, the defect type group determining portion 210 determines whether or not there is the characteristic value center vector Ci, which is not a process object out of the characteristic value center vectors Ci of all clusters (hereinafter, simply referred to as unprocessed characteristic value center vector Ci) (step ST402). If it is determined that there is the unprocessed characteristic value center vector Ci, the defect type group determining portion 210 executes the process of step ST403. If not, the defect type group determining portion 210 executes the process of step ST404.

If it is determined that there is the unprocessed characteristic value center vector Ci in step ST402, the defect type group determining portion 210 calculates the distance between one of the unprocessed characteristic value center vectors Ci and the group determination characteristic value vector X (step ST403). After that, the defect type group determining portion 210 returns to step ST402 and repeats the above-described processing.

If it is determined that there is no unprocessed characteristic value center vector Ci, the defect type group determining portion 210 sets the minimum value out of the distances Di calculated in step ST403, as Dmin (step ST404). Next, the defect type group determining portion 210 obtains the defect type group corresponding to the characteristic value center vector Ci used for calculating the distance, as Dmin, and determines that it is the defect type of the defective image information (step ST405). After that, the defect type group determining portion 210 ends processing.

In accordance with the above-described configuration, the defect type group of the defect included in the output image is determined based on the difference between the fundamental image reduction information and the read-in image reduction information, each having the reduced information amount thereof. Therefore, for example, as compared to the case where the defect type is determined based on the difference between the fundamental image reduction information and the read-in image reduction information, it is possible to reduce the information amount and the calculation amount necessary for determination.

In addition, in accordance with the above-described configuration, the differential information represents the difference 6f the defect between the fundamental image reduction information and the read-in image reduction information. Therefore, for example, as compared to the case where the defect type is determined based on the characteristic value calculated from only the read-in image reduction information, it is possible to improve the precision of determining the defect type.

Furthermore, in accordance with the above-described configuration, the defect type can be determined by the clustering process based on the characteristic value calculated with the use of the differential information. Therefore, for example, as compared to the case where an operator individually or qualitatively checks the output image to determine the defect type, it is possible to decrease the labor of the operator, and in addition, the precision of determining the defect type is not affected by the ability level of the operator to infer the defect type.

Figure 16A:
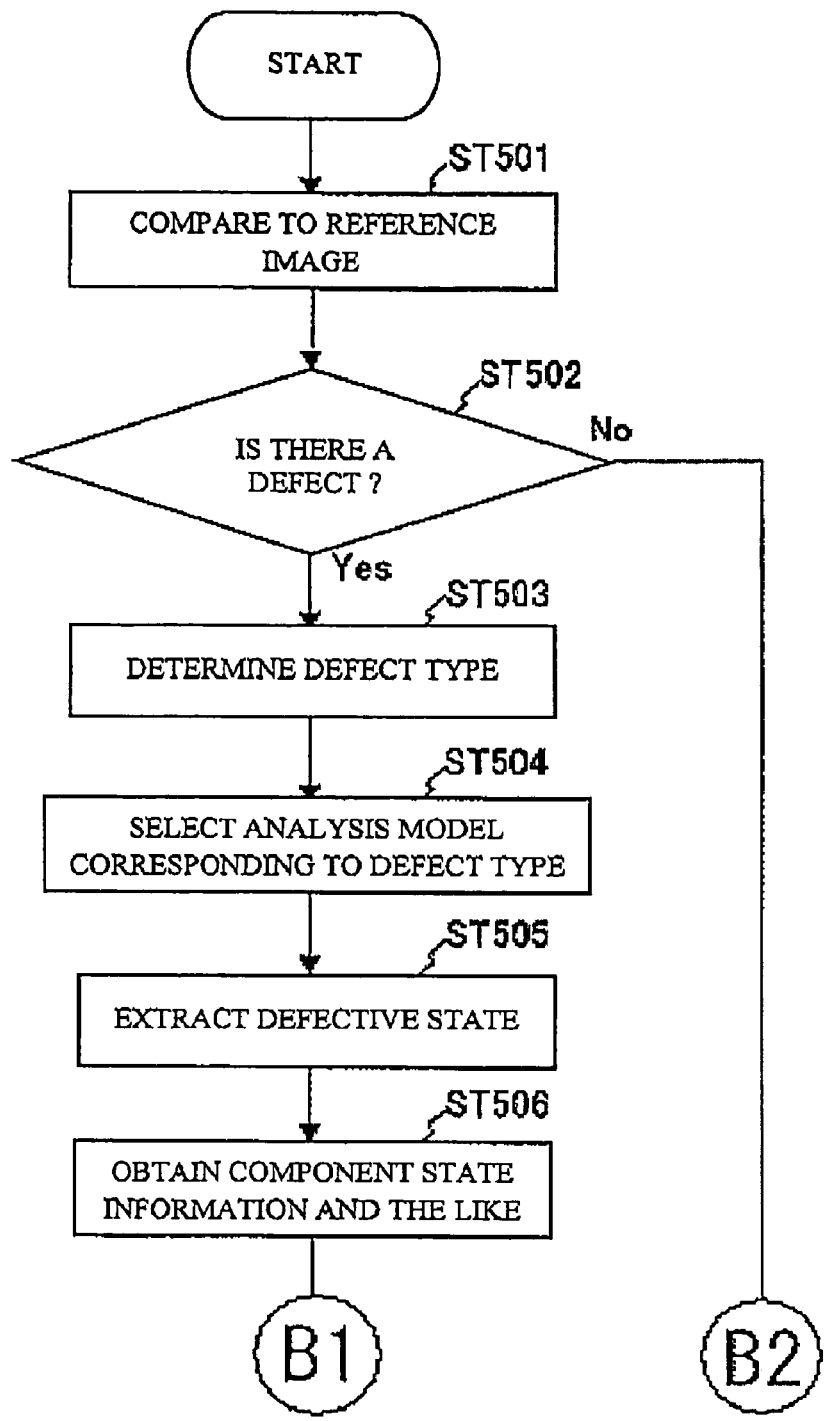
FIG. 16A and FIG. 16B show a flowchart showing another example of the failure location determination processing executed by the controller.
Figure 16B:
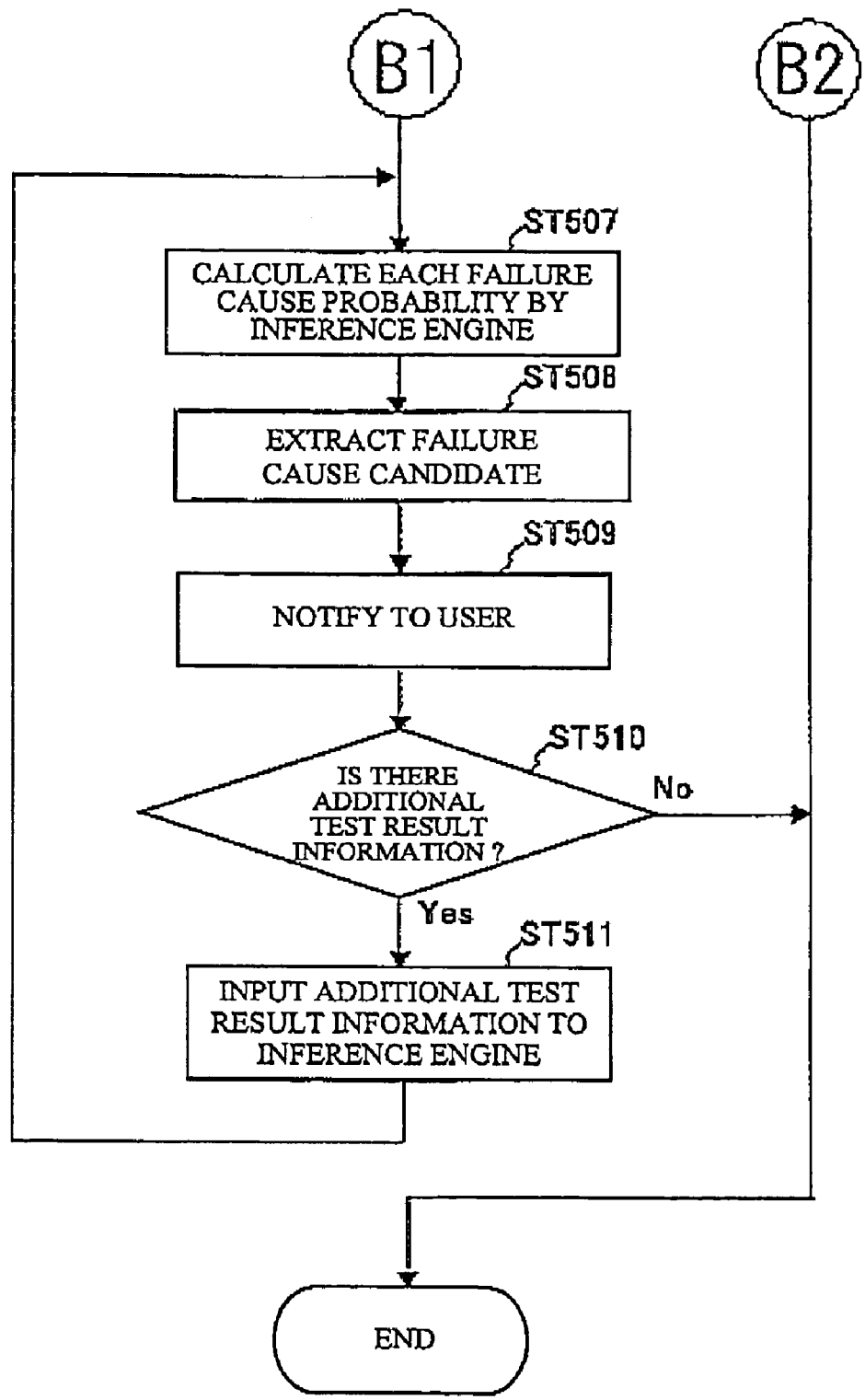

Next, a description will be given of the failure location determination processing shown in step ST105 of FIG. 8, with reference to FIG. 16A and FIG. 16B. FIG. 16A and FIG. 16B show a flowchart showing another example of the failure location determination processing executed by the controller 160.

Firstly, the controller 160 checks that there is an image defect by comparing the read-in image and the reference image previously retained in the apparatus by the image defect detecting portion 1510 included in the failure analysis portion 150 (step ST501). If it is determined that there is a defect, the controller 160 executes the process of step ST503. If not, there is a possibility that the previous defect is an accidental one, or such a defect has been already resolved by some measures prior to the output of the test pattern, and the controller 160 notifies the aforementioned state to a user through the operation screen and ends processing (step ST502-N).

If it is determined that there is a defect (step ST502-Y), the controller 160 notifies an execution instruction to determine the defect type, to the image defect detecting portion 1510 (step ST503). Next, the controller 160 selects the analysis model 1543 corresponding to the defect type determined by the image defect detecting portion 1510, and notifies the result to the failure probability inference portion 1540 (step ST504).

Next, the controller 160 sends an execution notification to the characteristic amount extracting portion 1520 (step ST505). Then, the controller 160 further sends an execution notification to obtain various data necessary for failure analysis such as condition information of each component composing the image forming apparatus 100, history information such as a counter value indicating the number of printouts for each component, and environmental information such as temperature and humidity in the apparatus, to the component condition information obtaining portion 1531, the history information obtaining portion 1532, and the environmental information obtaining portion 1533 (step ST506).

After that, the controller 160 sends an execution notification to calculate the probability of each failure cause based on the analysis model selected in step ST504 and the information obtained in step ST505 and step ST506, to the inference engine 1542 (step ST507).

Subsequently, the controller 160 sends to the failure candidate extracting portion 1541, an execution notification to extract a given number of the failure cause candidates in the descending order of high probability of the failure cause, based on the probability calculated in step ST507, (step ST508) The number of the candidates may be predetermined and set, or may be designated by inputting a given number prior to the extraction of the candidates.

After that, the controller 160 controls the analysis result notifying portion 1560 to display the extracted failure cause candidates on a display device such as a control panel to notify such result to a user (step ST509).

Next, the controller 160 determines whether or not the failure cause candidates can be narrowed down based on whether there is the additional test result information (step ST510). If it is determined that the failure cause candidates can be narrowed down, the controller 160 ends processing. If not, the controller 160 executes the process of step ST511.

More specifically, in the above-described automatic determination process, it is not always possible to narrow down to one failure cause candidate at this point. Therefore, if failure cause candidates are not narrowed down at this point, a user selects an additional operation item necessary for an additional failure-analysis by means of the operation screen.

The controller 160 gives an instruction to the print engine portion 120 to output the image once again under the changed operation conditions of the image forming apparatus 100 according to the selected item. Then, a user inputs information of the additional test result through the operation screen. The additional operation at this point is intended to examine the change in the defect developmental state. For example, the image is scaled up or down, or the test pattern retained in each location of the image path is output. Therefore, the additional test result can be easily input from a user in accordance with questions on the operation screen. Consequently, the controller 160 determines that the failure cause candidates are not narrowed down by receiving the added information.

If it is determined that there is additional test result information in step ST510, the controller 160 transmits the received additional test result information to the inference engine 1542 (step ST511). Then, the controller 160 returns to step ST507 and calculates the failure cause probability once again based on the additional information and already input information, narrows down the failure candidates with the use of the result, and repeats the above-described processing.

In accordance with the above-described configuration, extracting the characteristic amount and obtaining the internal condition information are performed without a user. Therefore, it is possible to improve the efficiency by eliminating the user's input of the defect information every time. In addition, a detailed and precise analysis is available even without professional knowledge on the apparatus.

The description has been given of the case where the read-in image reduction information is the projecting waveform of the read-in image information, the fundamental image reduction information is the projecting waveform of the fundamental image information, and the output image reduction information is the projecting waveform of the output image information. However, the invention is not limited thereto.

Figure 17:
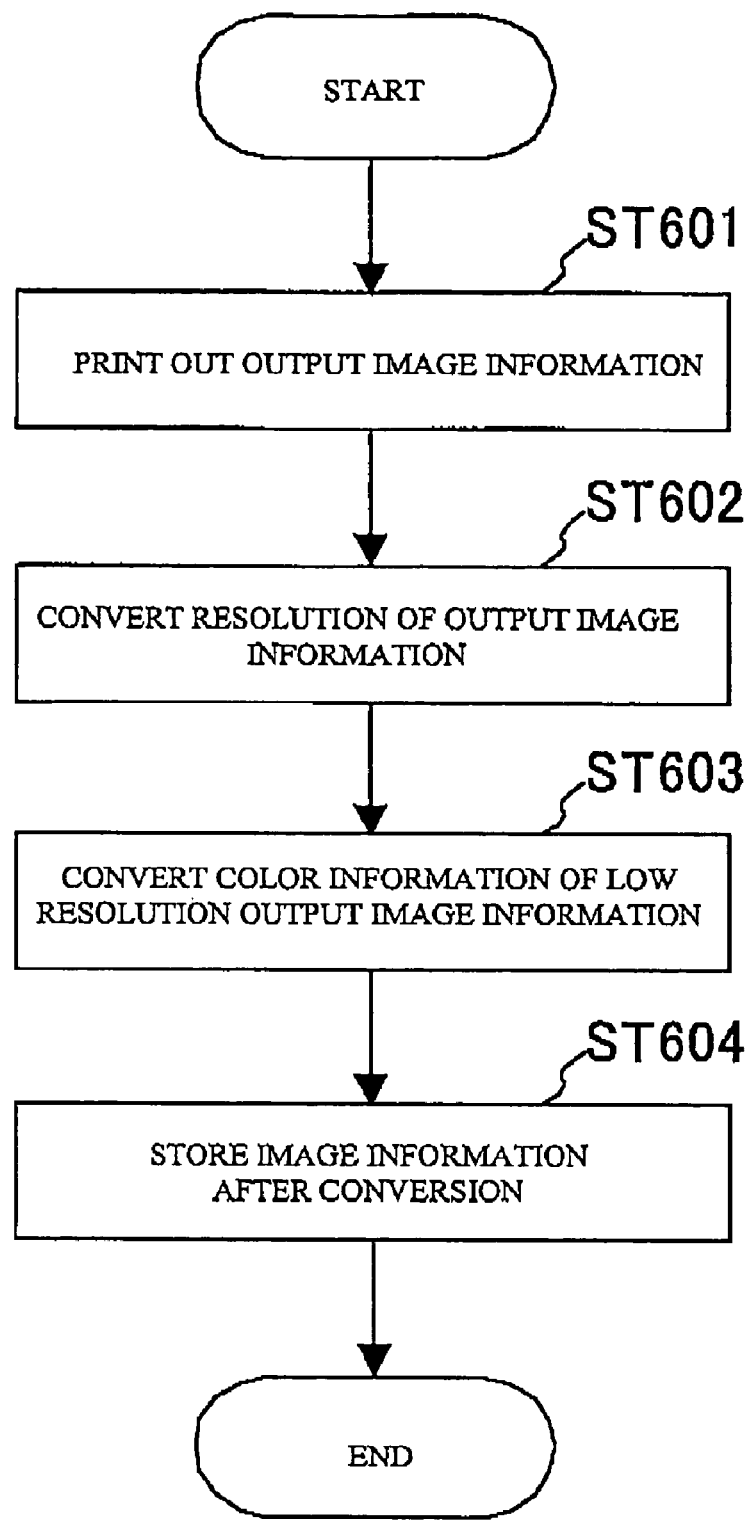
FIG. 17 is a flowchart showing another example of the output control process executed by the controller.
Figure 18A:
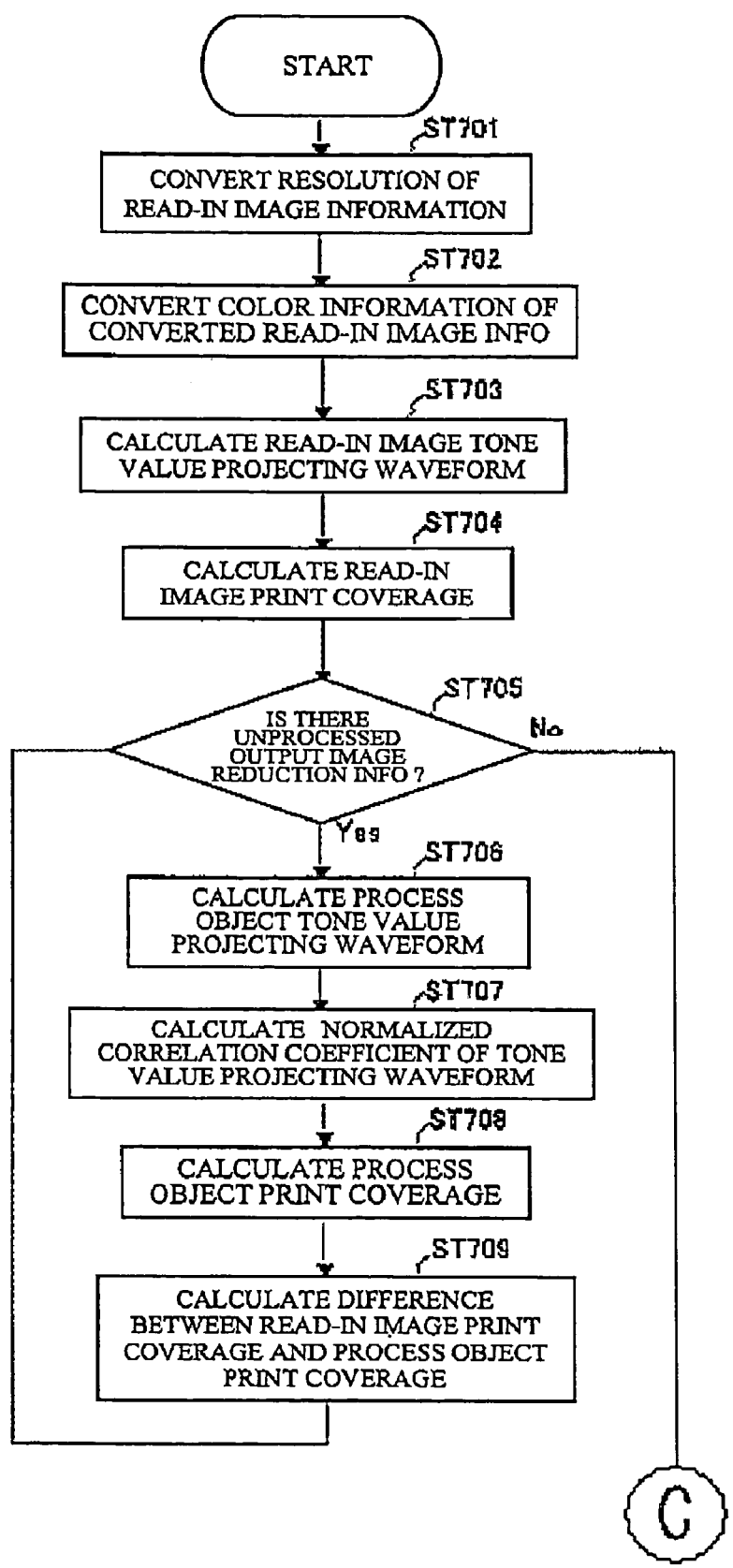
FIG. 18A and FIG. 18E show a flowchart showing another example of the test chart determination process executed by the controller.
Figure 18B:
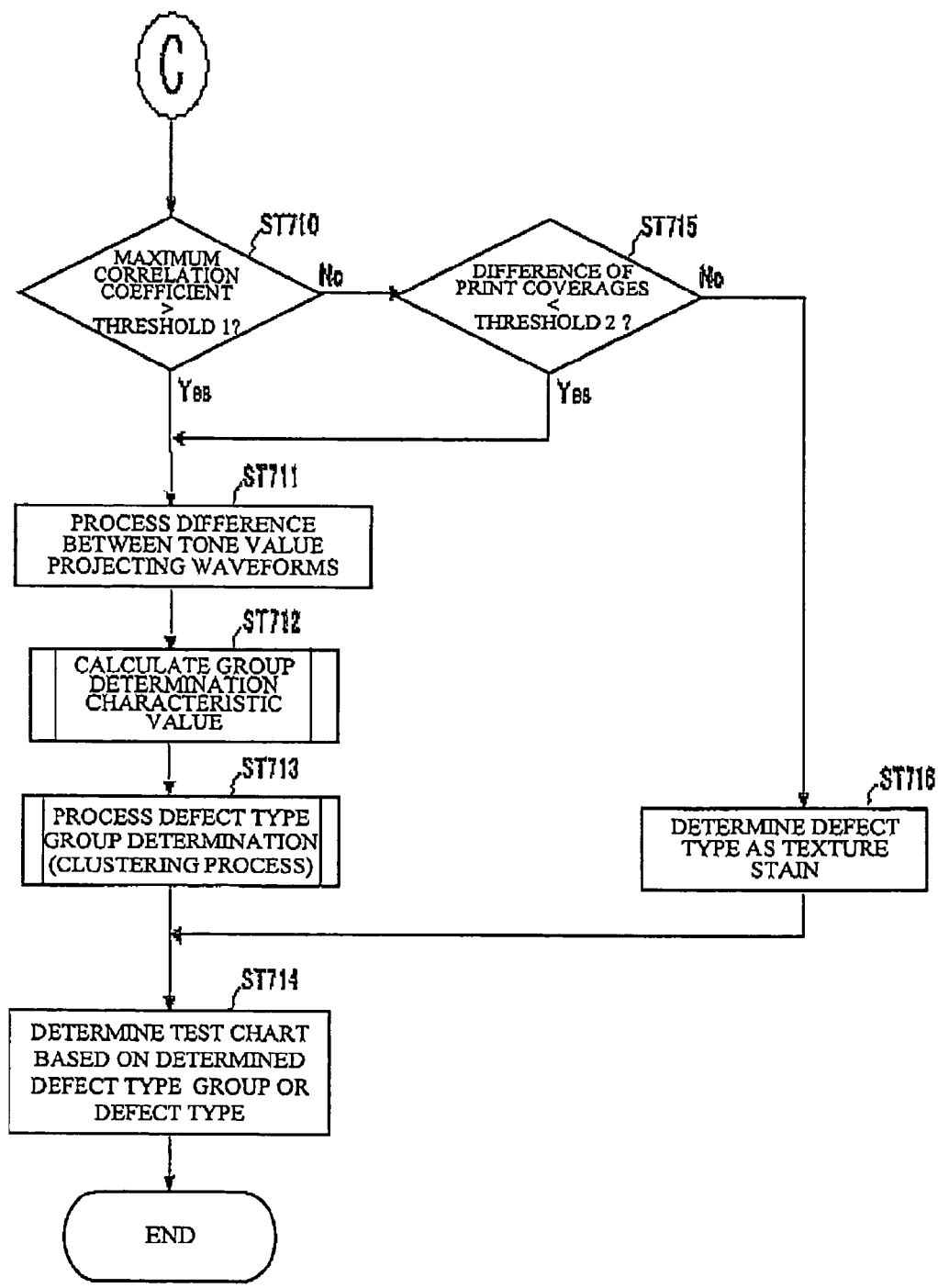

A description will be hereinafter given of another exemplary embodiment of the invention, with reference to FIG. 17, FIG. 18A, and FIG. 18B. In the present exemplary embodiment, the read-in image reduction information is image information expressing the read-in image information with a lower resolution than that of the read-in image information. The fundamental image reduction information is image information expressing the fundamental image information with a lower resolution than that of the fundamental image information. The output image reduction information is image information expressing the output image information with a lower resolution than that of the output image information.

At the same time, a description will be given of yet another exemplary embodiment of the invention, with reference to FIG. 17, FIG. 18A, and FIG. 18B. In the present exemplary embodiment, the read-in image reduction information is image information expressing the read-in image information with a smaller color number than that of the read-in image information. The fundamental image reduction information is image information expressing the fundamental image information with a smaller color number than that of the fundamental image information. The output image reduction information is image information expressing the output image information with a smaller color number than that of the output image information.

Since the configuration of the image forming apparatus 100 in another exemplary embodiment of the invention is almost similar to that of the image forming apparatus 100 shown in FIG. 1, the description thereof will be omitted.

However, since the information stored in the memory 170 and the processing of the controller 160 are different from those of the image forming apparatus 100 shown in PIG. 1, a description thereof will now be given, with reference to FIG. 17, FIG. 18A, and FIG. 18B. FIG. 17 is a flowchart showing another example of the output control process executed by the controller 160.

Firstly, since the processes of step ST601 and step ST602 executed by the controller 160 are similar to those of step ST101 and step ST102 shown in FIG. 8, a description thereof will be omitted.

Next, the controller 160 converts the low-resolution output image information to the image information with a lower color number than that of the output image information (step ST603). For example, when the output image information (and the low resolution output image information) is created to have a data format with the data size per pixel being 256 colors, the low resolution output image information is converted to the image information expressed by a data format with the data size per pixel of 16 colors, which is smaller than 256 colors.

After that, the controller 160 causes the converted image information, which is firstly converted in step ST602 and then further converted in step ST603, to be stored in the memory 170, as the output image reduction information (step ST604). Here, processing is different from the output control process shown in FIG. 7 in that the controller 160 causes the output image reduction information only to be stored in the memory 170 and does not causes the print coverage to be stored.

In accordance with the above-described configuration, the data amount of the image information having such converted low resolution is smaller than that of the image information prior to the conversion. Therefore, for example, as compared to the case where the output image information is stored in the memory, the memory resources to be used can be saved.

Further, in accordance with the above-described configuration, the data amount of the image information expressed by the smaller color number is smaller than that of the image information prior to conversion. Therefore, for example, as compared to the case where the output image information is stored in the memory, the memory resources to be used can be saved.

Next, a description will be given of another example of the test chart determination process in step ST102 of FIG. 8. FIG. 18A and FIG. 18B show a flowchart showing another example of the test chart determination process executed by the controller 160.

Firstly, the controller 160 converts the resolution of the read-in image information obtained by the image obtaining portion 110 to a lower resolution than that of the read-in image information (step ST701). The resolution of the image information subsequent to the conversion in the present step is same as that of the image information subsequent to the conversion in step ST602 of FIG. 17.

Next, the controller 160 converts the read-in image information converted in step ST701 to the image information expressed with a lower color number than that of the read-in image information (step ST702).

After that, the controller 160 gives an instruction to the parameter calculating portion 180 to calculate the tone value projecting waveform of the read-in image information converted in step ST701 and step ST702 (step ST703). The tone value projecting waveform calculated by the parameter calculating portion 180 based on the instruction issued in the present step is referred to as read-in image tone value projecting waveform.

Next, the controller 160 gives an instruction to the parameter calculating portion 180 to calculate the print coverage of the read-in image information converted in step ST701 and step ST702 (step ST704). The print coverage calculated by the parameter calculating portion 180 based on the instruction issued in the present step is referred to as read-in image print coverage.

Subsequently, the controller 160 determines whether or not the memory 170 stores unprocessed output image reduction information, which is not a process object in steps ST706 to ST709, described later (step ST705). If it is determined that there is the unprocessed output image reduction information, the controller 160 executes the process of step ST706. If not, the controller 160 executes the process of step ST710.

If it is determined that there is the unprocessed output image reduction information in step ST705, the controller 160 sets one of the unprocessed output image reduction information, as a process object. The output image reduction information set as the process object is referred to as process object output image reduction information.

Next, the controller 160 instructs the parameter calculating portion 180 to calculate the tone value projecting waveform of the process object output image reduction information (step ST706). The tone value projecting waveform calculated by the parameter calculating portion 180 based on the instruction issued in the present step is referred to as process object tone value projecting waveform.

Then, the controller 160 calculates a normalized correlation coefficient between the read-in image tone value projecting waveform calculated in step ST703 and the process object tone value projecting waveform calculated in step ST706 (step ST707).

After that, the controller 160 instructs the parameter calculating portion 180 to calculate the print coverage of the process object output reduction information (step ST708). The print coverage calculated by the parameter calculating portion 180 based on the instruction issued in the present step is referred to as process object print coverage.

Next, the controller 160 calculates the difference between the read-in image print coverage calculated in step ST704 and the process object print coverage calculated in step ST708 (step ST709). Subsequently, the controller 160 returns to step ST705 and repeats the above-described processing.

If it is determined that there is no unprocessed output image reduction information in step ST705, the controller 160 determines whether or not the correlation coefficient with the maximum value out of the correlation coefficients calculated in step ST707 (hereinafter, simply referred to as maximum correlation coefficient) exceeds the given threshold value of 1 (step ST710) in the same manner as the process in step ST206 of FIG. 10B. Here, the given threshold value of 1 is a positive constant number. If it is determined that the maximum correlation coefficient exceeds the given threshold value of 1, the controller 160 executes the process of step ST711. If not, the controller 160 executes the process of step ST715.

If it is determined that the maximum correlation coefficient exceeds the given threshold value of 1 in step ST710 or the difference between the print coverages is smaller than the given threshold value of 2 in step ST715, the controller 160 executes the processes of steps ST711 to ST714. After that, the controller 160 ends processing. Since the processing from steps ST711 to ST714 is similar to that from step ST207 to ST210 of FIG. 10B, the description thereof will be omitted.

If it is determined that the maximum correlation coefficient does not exceed the given threshold value of 1 in step ST710, the controller 160 determines whether or not the difference of the print coverages obtained in step ST709 is smaller than the given threshold value of 2 (step ST715). If it is determined that the difference between the print coverages is smaller than the given threshold value of 2, the controller 160 executes the process of step ST711. If not, the controller 160 executes the process of step ST716.

If it is determined that the difference between the print coverages is equal to or more than the given threshold value of 2, the controller 160 executes the process of step ST716 and step ST714 in this order. After that, the controller 160 ends processing. Since the processes of step ST714 and step ST716 are similar to those of steps ST210 and ST211 of FIG. 10B, the description thereof will be omitted.

In the above-described exemplary embodiments, while the center vector of the cluster is defined as the center of the smallest sphere including the coordinate group expressed by the group determination characteristic value of the defect, which composes the cluster, the invention is not limited thereto. For example, the center vector of the cluster may be defined as the average value of the coordinate group expressed by the group determination characteristic values of the defect, which composes the cluster.

In the above-described exemplary embodiments, while the description has been given of the case where calculating the distance D1 between the cluster and the group determination characteristic value vector X is performed by calculating Mahalanobis distance, the invention is not limited thereto. For example, calculating the distance D1 between the cluster and the group determination characteristic value vector X may be performed by calculating Euclid distance, standardized Euclid distance, Euclid square distance, Manhattan distance, Chebychev distance, or Minkowski distance.

In the above-described exemplary embodiments, while the description has been given of the case where the length of the group determination characteristic value is obtained by calculating the distance between the group determination characteristic value vector and the origin, and the distance thereof is obtained by calculating Mahalanobis distance, the invention is not limited thereto. For example, the distance may be obtained by calculating Euclid distance, standardized Euclid distance, Euclid square distance, Manhattan distance, Chebychev distance, or Minkowski distance.

A failure analysis method employed according to an aspect of the present invention is performed with a Central Processing Unit (CPU), Read Only Memory (ROM), Random Access Memory (RAM), and the like, by installing a program from a portable memory device or a storage device such as a hard disc device, CD-ROM, DVD, or a flexible disc or downloading the program through a communications line. Then the steps of program are executed as the CPU operates the program.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A failure analysis system comprising:
an obtaining portion that obtains read-in image information that is image information obtained by reading an output image;
a memory that stores fundamental image reduction information that is information in which an information amount of fundamental image information is reduced, the fundamental image information serving as a fundamental of the output image;
a calculating portion that calculates a characteristic value of a projecting waveform by use of differential information between read-in image reduction information and the fundamental image reduction information, the read-in image reduction information being information in which the information amount of the read-in image information obtained by the obtaining portion is reduced, the fundamental image reduction information being stored in the memory; and
a determining portion that determines a defect type group that is a group of defect types of elements included in the output image by use of a clustering process on the basis of the characteristic value calculated by the calculating portion, wherein:
the memory further stores output image reduction information that is information in which the information amount of the image information serving as a fundamental of the output image output in the past is reduced;
the fundamental image reduction information is the output image reduction information stored in the memory;
the read-in image reduction information is the image information expressing the read-in image information with a smaller color number than that of the read-in image information;
the fundamental image reduction information is the image information expressing the fundamental image information with a smaller color number than that of the fundamental image information; and
the output image reduction information is the image information expressing the output image information with a smaller color number than that of the output image information.

2. A failure analysis system comprising:
an obtaining portion that obtains read-in image information that is image information obtained by reading an output image;
a memory that stores fundamental image reduction information that is information in which an information amount of fundamental image information is reduced, the fundamental image information serving as a fundamental of the output image;
a calculating portion that calculates a characteristic value of a projecting waveform by use of differential information between read-in image reduction information and the fundamental image reduction information, the read-in image reduction information being information in which the information amount of the read-in image information obtained by the obtaining portion is reduced, the fundamental image reduction information being stored in the memory; and
a determining portion that determines a defect type group that is a group of defect types of elements included in the output image by use of a clustering process on the basis of the characteristic value calculated by the calculating portion, wherein:
the memory further stores a fundamental image print coverage that is a print coverage representing a ratio of a print region to a whole region of the fundamental image information; and
the determining portion determines a defect type included in the output image to be a texture stain on the basis of a difference between a read-in image print coverage that is a print coverage calculated by use of the read-in image information and the fundamental image print coverage stored in the memory.

3. The failure analysis system according to claim 2, wherein:
the memory stores and associates output image reduction information with an output image print coverage that is the print coverage of the output image information; and
the fundamental image print coverage is the output image print coverage stored in the memory, and is the print coverage associated with the fundamental image reduction information.

4. A failure analysis system comprising:
an obtaining portion that obtains read-in image information that is image information obtained by reading an output image;
a memory that stores fundamental image reduction information that is information in which an information amount of fundamental image information is reduced, the fundamental image information serving as a fundamental of the output image;
a calculating portion that calculates a characteristic value of a projecting waveform by use of differential information between read-in image reduction information and the fundamental image reduction information, the read-in image reduction information being information in which the information amount of the read-in image information obtained by the obtaining portion is reduced, the fundamental imam reduction information being stored in the memory;
a determining portion that determines a defect type group that is a group of defect types of elements included in the output image by use of a clustering process on the basis of the characteristic value calculated by the calculating portion;
a failure analysis portion that analyzes a failure of an individual component included in an image forming apparatus by analyzing a failure analysis model that models a cause for the failure of the image forming apparatus;
an internal condition information obtaining portion that obtains internal condition information of the apparatus, the internal condition information being input to the failure analysis model;
an image defect detecting portion that analyzes a defect of the output image by comparing a reference image for checking and an image to be checked, the reference image for checking corresponding to the defect type group determined by the determining portion, the image to be checked being obtained by optically reading the reference image output from the image forming apparatus; and a characteristic amount extracting portion that extracts a characteristic amount that characterizes a defect of the output image analyzed by the image defect detecting portion,
wherein the failure analysis portion identifies a failure cause by analyzing the failure analysis model corresponding to the defect type determined by the determining portion by use of the information on the characteristic amount and the internal condition information.

5. A failure analysis system comprising:
an obtaining portion that obtains read-in image information that is image information obtained by reading an output image;
a memory that stores fundamental image reduction information that is information in which an information amount of fundamental image information is reduced, the fundamental image information serving as a fundamental of the output image;
a calculating portion that calculates a characteristic value of a projecting waveform by use of differential information between read-in image reduction information and the fundamental image reduction information, the read-in image reduction information being information in which the information amount of the read-in image information obtained by the obtaining portion is reduced, the fundamental image reduction information being stored in the memory;
a determining portion that determines a defect type group that is a group of defect types of elements included in the output image by use of a clustering process on the basis of the characteristic value calculated by the calculating portion, wherein
the characteristic value on the projecting waveform represents an integration value of a time value histogram, a high tone value waveform width that is a sum of waveform widths having a tone value over a threshold value in a tone value projecting waveform, a standard deviation of the tone value histogram, a standard deviation of the tone value projecting waveform, a peak number of the tone value projecting waveform, the maximum value of the tone value projecting waveform, and a frequency component magnitude of the tone value projecting waveform.

6. A non-transitory computer readable medium storing a program causing a computer to execute a process for failure analysis, the process comprising:
obtaining read-in image information that is image information obtained by reading an output image;
storing fundamental image reduction information that is information in which an information amount of fundamental image information is reduced, the fundamental image information serving as a fundamental of the output image;
calculating a characteristic value of a projecting waveform by use of differential information between read-in image reduction information and the fundamental image reduction information, the read-in image reduction information being information in which the information amount of the read-in image information obtained by the obtaining step is reduced, the fundamental image reduction information being stored in a memory; and
determining a defect type group that is a group of defect types of elements included in the output image by use of a clustering process on the basis of the characteristic value calculated by the calculating step, wherein:
the memory further stores output image reduction information that is information in which the information amount of the image information serving as a fundamental of the output image output in the past is reduced;
the fundamental image reduction information is the output image reduction information stored in the memory;
the read-in image reduction information is the image information expressing the read-in image information with a smaller color number than that of the read-in image information;
the fundamental image reduction information is the image information expressing the fundamental image information with a smaller color number than that of the fundamental image information; and
the output image reduction information is the image information expressing the output image information with a smaller color number than that of the output image information.

7. A non-transitory computer readable medium storing a program causing a computer to execute a process for failure analysis, the process comprising:
obtaining read-in image information that is image information obtained by reading an output image;
storing fundamental image reduction information that is information in which an information amount of fundamental image information is reduced, the fundamental image information serving as a fundamental of the output image;
calculating a characteristic value of a projecting waveform by use of differential information between read-in image reduction information and the fundamental image reduction information, the read-in image reduction information being information in which the information amount of the read-in image information obtained by the obtaining step is reduced, the fundamental image reduction information being stored in a memory; and
determining a defect type group that is a group of defect types of elements included in the output image by use of a clustering process on the basis of the characteristic value calculated by the calculating step, wherein:
the memory further stores a fundamental image print coverage that is a print coverage representing a ratio of a print region to a whole region of the fundamental image information; and
the determining step determines a defect type included in the output image to be a texture stain on the basis of a difference between a read-in image print coverage that is a print coverage calculated by use of the read-in image information and the fundamental image print coverage stored in the memory.

8. A non-transitory computer readable medium storing a program causing a computer to execute a process for failure analysis, the process comprising:
obtaining read-in image information that is image information obtained by reading an output image;
storing fundamental image reduction information that is information in which an information amount of fundamental image information is reduced, the fundamental image information serving as a fundamental of the output image;
calculating a characteristic value of a projecting waveform by use of differential information between read-in image reduction information and the fundamental image reduction information, the read-in image reduction information being information in which the information amount of the read-in image information obtained by the obtaining step is reduced, the fundamental image reduction information being stored in a memory;

determining a defect type group that is a group of defect types of elements included in the output image by use of a clustering process on the basis of the characteristic value calculated by the calculating step;

analyzing a failure of an individual component included in an image forming apparatus by analyzing a failure analysis model that models a cause for the failure of the image forming apparatus;

obtaining internal condition information of the apparatus, the internal condition information being input to the failure analysis model;

analyzing a defect of the output image by comparing a reference image for checking and an image to be checked, the reference image for checking corresponding to the defect type group determined by the determining step, the image to be checked being obtained by optically reading the reference image output from the image forming apparatus; and extracting a characteristic amount that characterizes a defect of the output image analyzed by the defect analyzing step, wherein the failure analysis step identifies a failure cause by analyzing the failure analysis model corresponding to the defect type determined by the determining portion by use of the information on the characteristic amount and the internal condition information.

9. A non-transitory computer readable medium storing a program causing a computer to execute a process for failure analysis, the process comprising:

obtaining read-in image information that is image information obtained by reading an output image;

storing fundamental image reduction information that is information in which an information amount of fundamental image information is reduced, the fundamental image information serving as a fundamental of the output image;

calculating a characteristic value of a projecting waveform by use of differential information between read-in image reduction information and the fundamental image reduction information, the read-in image reduction information being information in which the information amount of the read-in image information obtained by the obtaining step is reduced, the fundamental image reduction information being stored in a memory; and determining a defect type group that is a group of defect types of elements included in the output image by use of a clustering process on the basis of the characteristic value calculated by the calculating step, wherein the characteristic value on the projecting waveform represents an integration value of a tone value histogram, a high tone value waveform width that is a sum of waveform widths having a tone value over a threshold value in a tone value projecting waveform, a standard deviation of the tone value histogram, a standard deviation of the tone value projecting waveform, a peak number of the tone value projecting waveform, the maximum value of the tone value projecting waveform, and a frequency component magnitude of the tone value projecting waveform.

* * * * *